(12) United States Patent
Hirakawa

(10) Patent No.: US 8,977,005 B2
(45) Date of Patent: Mar. 10, 2015

(54) CARRIED ITEM REGION EXTRACTION DEVICE, CARRIED ITEM REGION EXTRACTION METHOD, AND COMPUTER READABLE MEDIUM

(75) Inventor: Yasufumi Hirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 72 days.

(21) Appl. No.: 13/822,124

(22) PCT Filed: Sep. 15, 2011

(86) PCT No.: PCT/JP2011/071751
§ 371 (c)(1),
(2), (4) Date: Mar. 11, 2013

(87) PCT Pub. No.: WO2012/036306
PCT Pub. Date: Mar. 22, 2012

(65) Prior Publication Data
US 2013/0182962 A1 Jul. 18, 2013

(30) Foreign Application Priority Data

Sep. 17, 2010 (JP) ................................ 2010-209434

(51) Int. Cl.
*G06K 9/00* (2006.01)
*G06K 9/46* (2006.01)
*G06T 7/00* (2006.01)
*G06K 9/32* (2006.01)

(52) U.S. Cl.
CPC ............ *G06K 9/4604* (2013.01); *G06T 7/0083* (2013.01); *G06K 9/3241* (2013.01); *G06T 2207/30232* (2013.01); *G06K 9/4633* (2013.01)
USPC ............................. 382/103; 382/190; 382/195

(58) Field of Classification Search
None
See application file for complete search history.

(56) References Cited

U.S. PATENT DOCUMENTS

| 7,231,087 B2 * | 6/2007 | Huber | 382/222 |
| 7,502,491 B2 * | 3/2009 | Shirai et al. | 382/107 |
| 7,650,012 B2 * | 1/2010 | Shibuya | 382/103 |
| 8,131,012 B2 * | 3/2012 | Eaton et al. | 382/103 |
| 8,305,440 B2 * | 11/2012 | McLeish et al. | 348/143 |
| 8,422,791 B2 * | 4/2013 | Liu et al. | 382/199 |

(Continued)

FOREIGN PATENT DOCUMENTS

| JP | 2006-006359 A | 1/2006 |
| JP | 2006-011965 A | 1/2006 |

(Continued)

OTHER PUBLICATIONS

Viola, et al., "Rapid Object Detection using a Boosted Cascade of Simple Features", In Proceedings of the 2001 IEEE Computer Society Conference on Computer Vision and Pattern Recognition, 2001, CVPR 2001, pp. 1-9.

Lowe, D., "Distinctive Image Features from Scale-Invariant Keypoints", Proceeding of International Journal of Computer Vision (IJCV), vol. 60, No. 2, Jan. 2004, pp. 91-110.

Csurka et al., "Visual Categorization with Bags of Keypoints", Proceeding of European Conference on Computer Vision, 2004, pp. 1-22.

(Continued)

*Primary Examiner* — Anand Bhatnagar
*Assistant Examiner* — Soo Park
(74) *Attorney, Agent, or Firm* — Sughrue Mion, PLLC

(57) ABSTRACT

Provided is a carried item region extraction device for accurately extracting a carried item region from an image.

This carried item region extraction device has: a string region processing unit for extracting a string region including a string of a carried item from image information; and a carried item region processing unit for extracting a carried item region including a carried item from the image information on the basis of the string region.

19 Claims, 20 Drawing Sheets

(56) References Cited

U.S. PATENT DOCUMENTS

| | | | | |
|---|---|---|---|---|
| 8,432,444 | B2* | 4/2013 | Neuhaus | 348/143 |
| 8,467,571 | B2* | 6/2013 | Momoi et al. | 382/103 |
| 8,611,590 | B2* | 12/2013 | Pakulski et al. | 382/103 |
| 8,620,028 | B2* | 12/2013 | Eaton et al. | 382/103 |
| 2010/0086213 | A1* | 4/2010 | Momoi et al. | 382/195 |
| 2011/0026853 | A1* | 2/2011 | Gokturk et al. | 382/305 |
| 2012/0163657 | A1* | 6/2012 | Shellshear | 382/103 |

FOREIGN PATENT DOCUMENTS

| | | |
|---|---|---|
| JP | 2009-007532 A | 1/2009 |
| JP | 2010-086482 A | 4/2010 |

OTHER PUBLICATIONS

Dalal et al., "Histograms of Oriented Gradients for Human Detection", Proceeding of Ieee Conference on Computer Vision and Pattern Recognition (CVPR), 2005, pp. 886-893.

(Editor) Mikio Takagi, (Editor) Haruhisa Shimoda, "New Edition Image Analysis Handbook", pp. 1669, Sep. 10, 2004, (ISBN-10:4130611194, Publisher: University of Tokyo Press).

International Search Report issued Dec. 20, 2011 in PCT/JP2011/071751.

Written Opinion issued Dec. 20, 2011 in PCT/JP2011/071751.

* cited by examiner

CARRIED ITEM REGION EXTRACTION DEVICE, CARRIED ITEM REGION EXTRACTION METHOD, AND COMPUTER READABLE MEDIUM

CROSS REFERENCE TO RELATED APPLICATIONS

This application is a National Stage of International Application No. PCT/JP2011/071751 filed Sep. 15, 2011, claiming priority based on Japanese Patent Application No. 2010-209434, filed Sep. 17, 2010, the contents of all of which are incorporated herein by reference in their entirety.

FIELD OF THE INVENTION

The present invention relates to a carried item region extraction device, a carried item region extraction method and a computer readable medium, which extract a region of a carried item held by a person from image information, in particular, relates to those which extract a region of a carried item from image information on the basis of a characteristic of the carried item.

BACKGROUND OF THE INVENTION

For ensuring safety, a management or security company of a building or a designated area utilizes a system in which an information processing device such as a computer extracts an image of a person or an object entering and leaving a gate from image information captured by a camera installed at the entrance (gate).

FIG. 20 is an example of a human extraction system which is one of such extraction systems.

In the human extraction system shown in FIG. 20, a human extraction device 90 extracts a human image from an image containing a human (image information), which is captured by a capturing device 91, and displays it on a display device 92.

As such methods of extracting a person or an object from image information, which such a human extraction device 90 utilizes, mentioned are detection methods using learning of a characteristic quantity of an image and using a classifier, or that using template matching.

Haar-like uses a characteristic quantity representing a pattern of brightness variation within an image, and detects a face by combining it with an AdaBoost classifier (for example, refer to non-patent document 1). Haar-like is suitable for extraction of a target object having characteristic brightness variation such as a human face containing eyes, a nose and a mouth.

SIFT (Scale-Invariant Feature Transform) is a method of, on the basis of a position and direction of a keypoint which is a characteristic point of an image, taking an edge direction of a region located around the keypoint as a characteristic quantity (SIFT feature) (for example, refer to non-patent document 2). SIFT is robust to rotation and variation in size, and thus suitable for extraction of objects with an identical shape. In addition, SIFT needs data for comparison.

Bag-of-Keypoints expresses an input image by a SIFT feature, and thus expresses an object using a frequency (frequency distribution: histogram) of a characteristic quantity obtained by vector-quantizing the SIFT feature (Visual word) (for example, refer to non-patent document 3). Further, Bag-of-Keypoints acquires in advance, on the basis of learning, a histogram of Visual words of the kinds (classes) of human or object. Then, Bag-of-Keypoints compares a histogram of the Visual words of an input image with the histogram of the Visual words acquired in advance, and thus classifies a human or an object into a class. Bag-of-Keypoints is suitable for extraction where the position in an image is stationary for a human or an object on which a characteristic quantity is to be extracted.

In contrast to that SIFT extracts an edge feature on the basis of a keypoint, HOG (Histograms of Oriented Gradients) is a method of extracting an edge feature with respect to a region (for example, refer to non-patent document 4). HOG is suitable for extraction of an object shape outline, compared to SIFT. However, HOG also needs data for comparison.

Template matching is a method of preparing, in advance, image information being a "template" of a shape desired to be extracted, and thus detecting a human or object resembling the template (for example, refer to non-patent document 5). The method using a template requires that image information of a human or object desired to be detected coincides with a template. Accordingly, if a human or object to compare has a plurality of appearances, the method using a template needs templates for all of the appearances.

And, as a method of human image recognition, mentioned is a method of recognizing a body region on the basis of a characteristic of a partial region of a human body (for example, of a chest) (for example, refer to Patent Document 1).

Further, as another method of human image recognition, mentioned is a method of not recognizing directly a region to be detected but estimating the desired region on the basis of another region (for example, refer to Patent Document 2). The invention described in Patent Document 2 approximates a region corresponding to a palm extracted using background subtraction by an elliptic region, determines whether the palm is a left or a right one on the basis of major and minor axes and inclining state of the elliptic region, and thus estimates a region corresponding to an elbow connecting with the palm.

The inventions described in Patent Documents 1 and 2 are suitable for extraction of a region whose shape and arrangement are stationary, such as a region corresponding to a chest or that of a palm and elbow.

[Patent Document 1] Japanese Patent Application Laid-Open No. 2006-006359

[Patent Document 2] Japanese Patent Application Laid-Open No. 2006-011965

[Non-patent Document 1] P. Viola, M. Jones, "Rapid Object Detection using a Boosted Cascade of Simple Features", Proc. IEEE Conf. on Computer Vision and Pattern Recognition, pp. 1-9, 2001.

[Non-patent Document 2] D. Lowe, "Distinctive Image Features from Scale-Invariant Keypoints", Proc. International Journal of Computer Vision (IJCV), 60 (2), pp. 91-110, Jan. 5, 2004.

[Non-patent Document 3] G. Csurka, C. R. Dance, L. Fan, J. Willamowski, and C. Bray, "Visual Categorization with Bags of Keypoints", Proc. European Conference on Computer Vision (ECCV), pp. 1-22, 2004.

[Non-patent Document 4] N. Dalal, B. Triggs, "Histograms of Oriented Gradients for Human Detection", Proc. IEEE Conference on Computer Vision and Pattern Recognition (CVPR), pp. 886-893, 2005.

[Non-patent Document 5] Mikio Takagi, Yousuke Shimoda, "new edition Image analysis handbook", p 1669, ISBN-10: 4130611194.

SUMMARY OF THE INVENTION

Problems to be Solved by the Invention

A carried item held by a person is one of such regions to be extracted from image information.

However, there are a wide variety of carried items held by a person, for example, such as a backpack, a shoulder bag, a pouch and a cardholder hung on a neck. Then, even carried items of the same type differ from each other in surface texture of the material or in color. For example, there are various kinds of backpacks which are different from each other in color and pattern, in addition to differences in texture such as between nylon, leather and vinyl. Further, even the same type of carried items may differ from each other in shape or silhouette (contour) as a result of differences in capacity, design or functionality. And, a carried item is usually accompanied with an attachment (accessory) such as an ornament. Yet further, a carried item made of a soft material such as cloth changes its shape according to the object it contains. And, a carried item changes its appearance (shape) also depending on a change in direction of the person holding it (change in posture).

In case of extracting such a carried item with large shape change from image information, there have been problems described below.

The method described in the above-mentioned non-patent document 1 (Haar-like) has a problem of difficulty in performing accurate extraction because a carried item does not necessarily have brightness variation.

The method described in the above-mentioned non-patent document 2 (SIFT) has a problem of difficulty in performing accurate extraction because a carried item is of a wide variety of types in shape and takes various postures.

The method described in the above-mentioned non-patent document 3 (Bag-of-Keypoints) has a problem of difficulty in performing accurate extraction because the position of a carried item cannot be specified.

And, in the method described in the above-mentioned non-patent document 2 (SIFT), the method described in non-patent document 4 (HOG) and the method described in non-patent document 5 (template), because a carried item changes its shape a lot and is of a wide variety of types, the amount of data corresponding to the expected postures and the type variations of a target object becomes enormous. Accordingly, the methods described in the above-mentioned non-patent documents 2, non-patent documents 4 and non-patent documents 5 have a problem of difficulty in preparing the necessary data.

The inventions described in the above-mentioned Patent Documents 1 and 2 have a problem of difficulty in performing accurate extraction because a carried item changes its shape a lot and its positional relationship is not constant, too.

The objective of the present invention is to solve the above-described problems, and thus to provide a carried item extraction device which accurately extracts an image region of a carried item held by a person from image information Means for Solving the Problem A carried item region extraction device of the present invention includes a string region processing unit which extracts a string region including a string of a carried item from image information, and a carried item region processing unit which extracts a carried item region including a carried item from the image information on the basis of the string region.

A carried item region extraction method of the present invention extracts a string region including a string of a carried item from image information and extracts a carried item region including a carried item from the image information on the basis of the string region.

A carried item region extraction program of the present invention causes a computer to execute a process of extracting a string region including a string of a carried item from image information, and a process of extracting a carried item region including a carried item from the image information on the basis of the string region.

Effect of the Invention

According to the present invention, it is possible to achieve the effect of accurately extracting a region of a carried item held by a person from image information.

EXEMPLARY EMBODIMENT OF THE INVENTION

Figure 1:
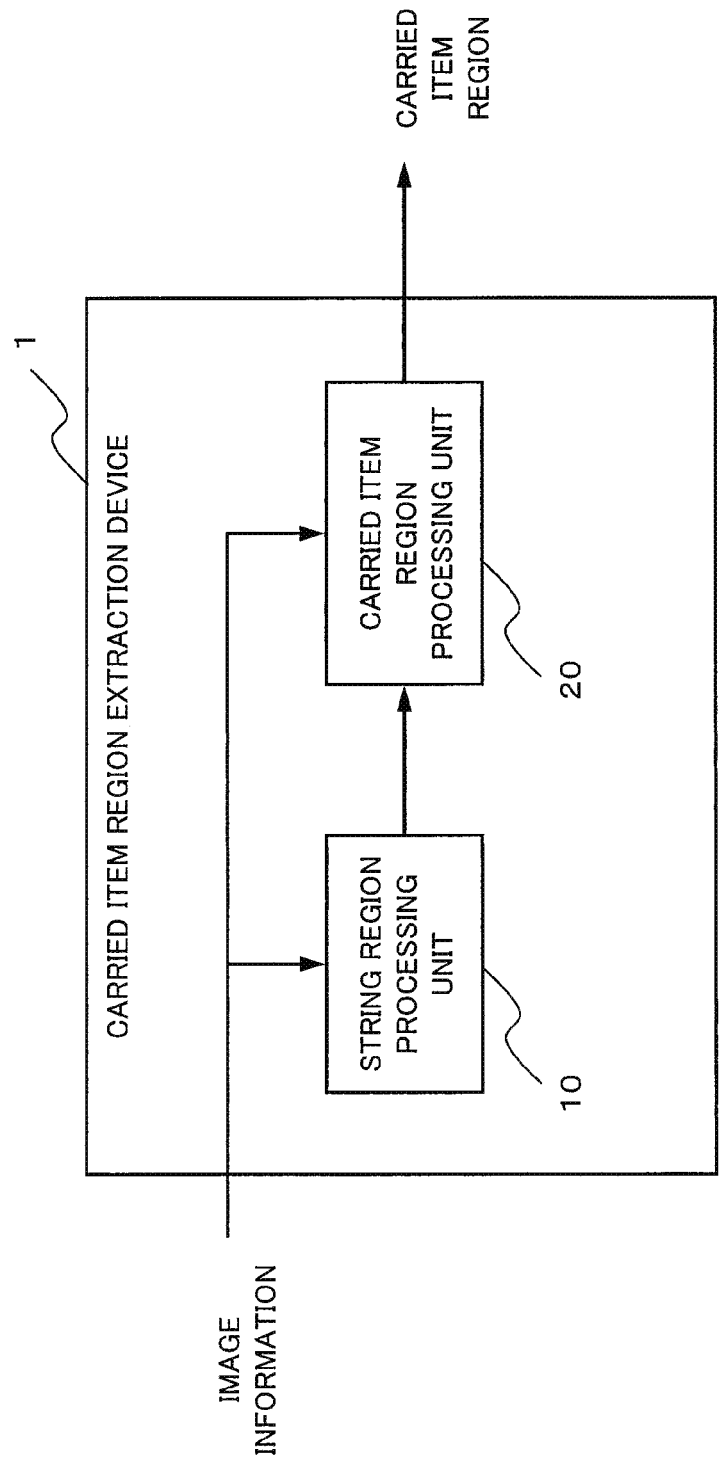
[FIG. 1] a block diagram showing an example of a carried item region extraction device according to a first exemplary embodiment of the present invention.

Exemplary embodiments of the present invention will be described below, with reference to drawings.

First, terminology used in the present exemplary embodiments will be defined.

A "carried item" means a portable tool in which a person puts an object to carry (bag, pack, pouch and the like), that is, one of the so-called bags and sacks. Each of carried item region extraction devices according to the present exemplary embodiments is a device for extracting a region including a "carried item" from image information. However, a carried item according to the present exemplary embodiments includes a carried item composed of a main body into which no object is put and a string, for example, a cellular phone or identification card hung from a neck using a neck strap.

A "string (string part)" is a string-shaped part (string, belt, chain and the like) for holding a carried item. A string includes a shoulder belt of a shoulder bag, a belt of a waist pouch, a carrying belt of a handbag and the like.

A "main body" means a primary part of a "carried item" to put an object therein, that is, a part except for a "string". A "main body" may include an attachment of a "carried item". However, a "main body" includes a primary part of a carried item not to contain an object.

A "region" means a section of an image including an image of a designated target object. A region is desired to have the same shape as that of a target object. However, considering processing efficiency, in terms of a region according to the present exemplary embodiments, a section including a target object is referred to as a region even if it has a different shape from that of a target object. For example, even when a carried item has a concavo-convex shape, a region of the carried item may be a section with a shape of a convex polygon (for example, quadrilateral) including the carried item. In this case, a region of a carried item becomes a section partly including background of the carried item. When a background part occupies a large proportion if an attachment of a carried item is included in a region (for example, in the case an attachment is a long, string-shaped ornament), a region of the carried item may be a section not including a part of the target object (in the above-described case, the string-shaped ornament as an attachment), in order to improve the accuracy of extraction.

An "edge" is a portion of a part (boundary part) dividing a target object (carried item, string, main body or human) from background in an image, and it corresponds to a minute portion extracted (detected) discontinuously. In particular, an edge located at a connection part between a "string" and a "main body" becomes an edge of both regions of the "string" and of the "main body". Image information for an edge is referred to as an "edge component".

An "edge line" means a line (line segment) generated by connecting edges sequentially, and it includes a straight line and a curved line. Image information for an edge line is referred to as an "edge line component".

An "edge line pair" means a pair of straight or curved edge lines dividing a target object region from other parts. For example, when a target object is a "string", a string region is determined to be a region included between an edge line pair of the string region. Image information for an edge line pair is referred to as an "edge line pair component". In addition, in the case of a string region, an edge line pair may be referred to as a string region line pair.

An "edge pair" means a pair of the above-mentioned edges dividing a target object region from other parts. Image information for an edge pair is referred to as an "edge pair component".

"Map information" means information representing an attribute (position, direction or arrangement) relating to a position in image information, which is included in each of the above-mentioned components.

(First Exemplary Embodiment)

A carried item region extraction device 1 according to a first exemplary embodiment of the present invention will be described with reference to drawings.

A string does not contain any object differently from a main body, and rarely stretches since it needs to hold a main body. And, a string seldom changes its appearance with a change of watching direction, and generally has a long, thin shape. Thus, a string has less shape change and keeps its shape more stable than a main body. Therefore, a carried item region extraction device 1 according to the present exemplary embodiment extracts from image information a string region including a string, which has a stable shape, and on the basis of the extracted string region, it extracts a carried item region including a carried item.

FIG. 1 is a block diagram showing an example of the carried item region extraction device 1.

The carried item region extraction device 1 includes a string region processing unit 10 and a carried item region processing unit 20.

The string region processing unit 10 receives image information (image data) captured by a capturing device not illustrated in the diagram, extracts a string region including a string of a carried item from the received image information, and outputs string region information corresponding to the extracted string region to the carried item region processing unit 20. In addition, image information according to the present exemplary embodiment may be either a still image or a moving image.

On the basis of the string region information received from the string region processing unit 10, the carried item region processing unit 20 extracts a carried item region including a carried item from the image information. The carried item region processing unit 20 may send carried item region information corresponding to the extracted carried item region to a carried item identification device or a display device, which are not illustrated in the diagram.

Each of the processing units will be described further with reference to drawings.

First, a configuration of the string region processing unit 10 according to the first exemplary embodiment will be described with reference to a drawing.

Figure 2:
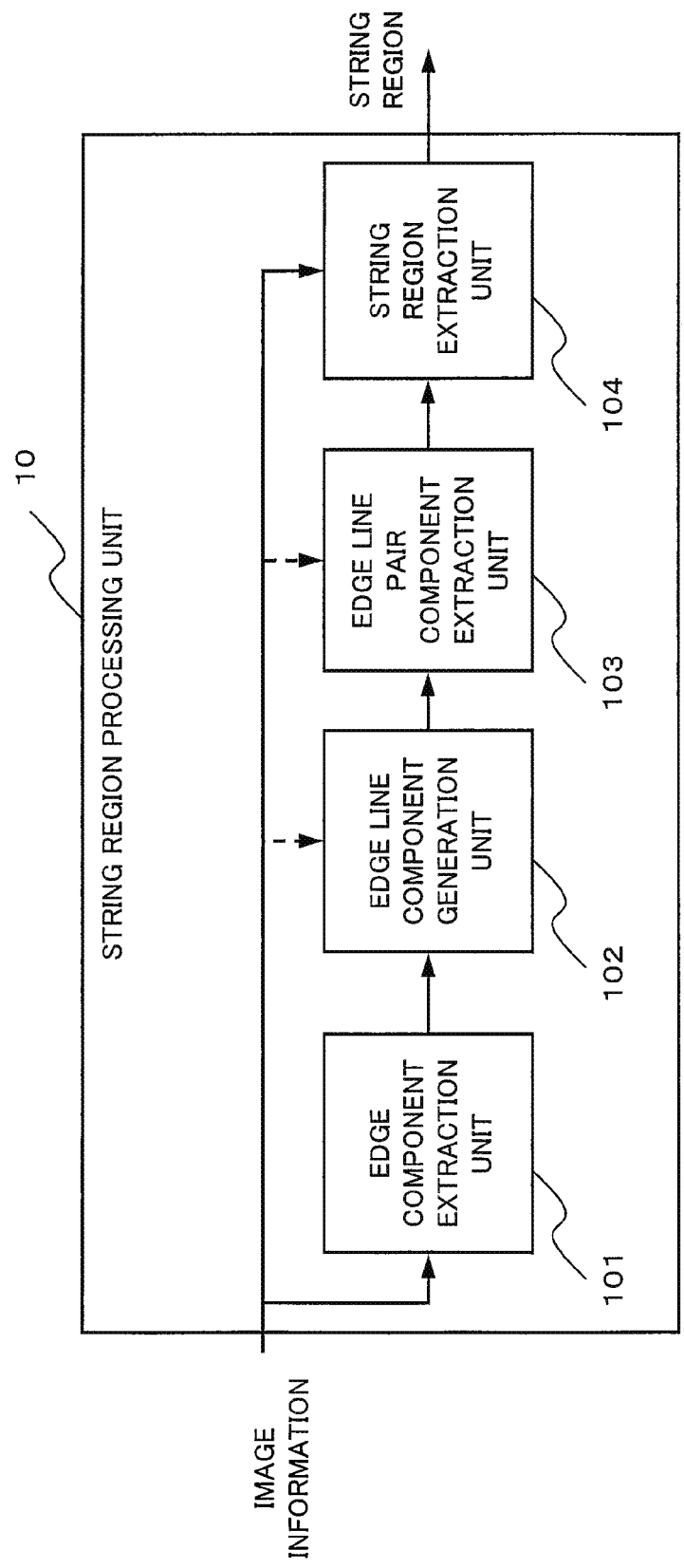
[FIG. 2] a block diagram showing an example of a string region processing unit according to the first exemplary embodiment.

FIG. 2 is a block diagram showing an example of a configuration of the string region processing unit 10.

The string region processing unit 10 includes an edge component extraction unit 101, an edge line component generation unit 102, an edge line pair component extraction unit 103 and a string region extraction unit 104.

The edge component extraction unit 101 receives image information, extracts edge components each including an edge which is estimated to be a portion of an edge part of an object from the image information, and outputs them to the edge line component generation unit 102.

On the basis of the received edge components, the edge line component generation unit 102 generates an edge line component including an edge line which connects edges, and outputs it to the edge line pair component extraction unit 103. In addition, the edge line component generation unit 102 may use image information in the generation process.

On the basis of the received edge line pair components, the edge line pair component extraction unit 103 extracts an edge line pair component which is a pair of edge line components estimated to represent a boundary of a string having a certain width, and outputs it to the string region extraction unit 104. In addition, the edge line pair component extraction unit 103 may use the image information in the extraction process.

On the basis of the received edge line pair component, the string region extraction unit 104 extracts a string region including a string of a carried item from the image information.

Next, operation of the string region processing unit 10 will be described with reference to a drawing.

Figure 3:
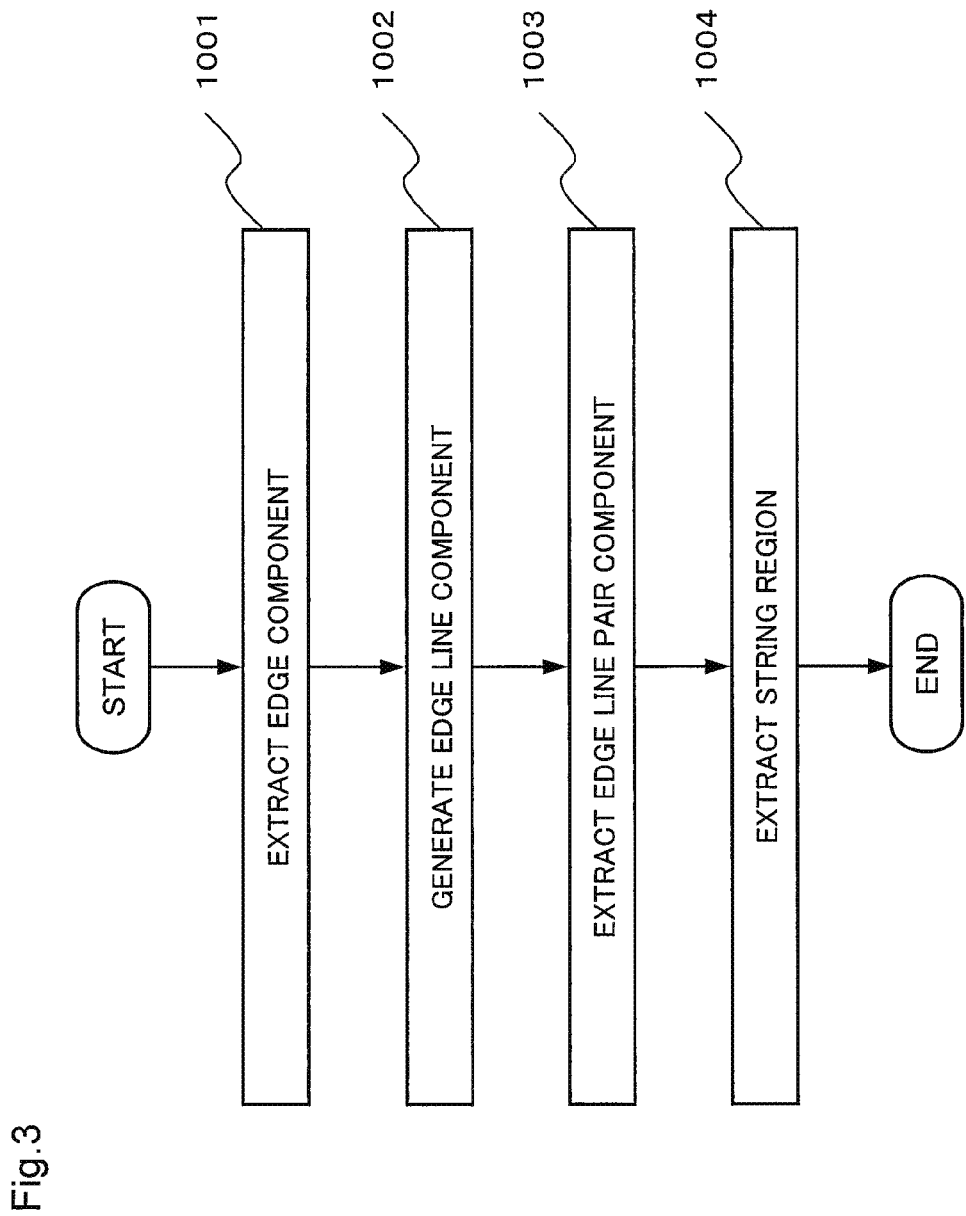
[FIG. 3] a flow chart illustrating an example of operation of a string region processing unit according to the first exemplary embodiment.

FIG. 3 is a flow chart illustrating an example of operation of the string region processing unit 10.

The edge component extraction unit 101 extracts an edge component included in received image information (Step 1001). For extracting an edge component, the edge component extraction unit 101 of the present exemplary embodiment may use various methods. For example, the edge component extraction unit 101 may extract an edge component by the use of a method or filter for edge extraction, such as the Sobel filter, the Canny Edge detector, the Laplacian filter and a differential filter. Alternatively, the edge component extraction unit 101 may calculate a difference in brightness or lightness between neighboring pixels in the image information, and thus extract a pixel giving a maximum value of the difference as an edge component. The edge component extraction unit 101 outputs the extracted edge component to the edge line component generation unit 102. The edge component includes map information.

In addition, the map information for the edge component according to the present exemplary embodiment includes information on the start and end positions of an edge, or the start position, direction and length of the edge. And, the map information for the edge component may include intensity or gradient information for the edge.

Here, the direction is a direction of the edge component in the image information. The direction can be expressed by a vector. This vector is called a directional vector. And, a vector perpendicular to the directional vector is a normal vector. There can be two kinds of directions depending on a manner of determining a start position of an edge component, but because no problem occurs if any one of the direction is used in combination with the corresponding start point, either of the directions may be used.

The intensity information is a difference in lightness in the image information across the edge. In accordance with the directions for detecting a directional vector of an edge, two ways of determining the lightness, where absolute values are identical and signs are opposite, can be adopted. However, if one of the two determination ways is constantly adopted, there occurs no problem in the operation of the present exemplary embodiment, and thus, detailed description will be omitted.

The gradient information is a degree (gradient) of change in lightness in the image information across an edge. Also with respect to the gradient, two ways of determining it, where absolute values are identical and signs are opposite, can be adopted in accordance with the directions for detecting a directional vector of an edge. Also with respect to the gradient, if one of the two determination ways is constantly adopted, there occurs no problem in the operation of the present exemplary embodiment, and thus, detailed description will be omitted. However, different angles with respect to the directional vector give different gradients. Because a gradient of change in lightness is at a maximum generally in the direction of a normal vector, the gradient information in the present exemplary embodiment is determined to be in the direction of a normal vector.

On the basis of the received edge components, the edge line component generation unit 102 extracts edge components estimated to be connected with each other, and thus generates an edge line component which is to be a candidate for an edge line pair component used by the edge line pair component extraction unit 103 following (Step 1002).

When described in more detail, the edge line component generation unit 102 operates as follows. First, by applying a line segment extraction process (for example, the Hough transform) to an edge component, the edge line component generation unit 102 extracts line segment information from the edge component. Further, on the basis of the characteristics of the edge component from which the line segment information was extracted (for example, the intensity and gradient of the edge component) and a relative relationship between edge components (for example, a positional or directional relationship), the edge line component generation unit 102 connects edge components which are connectable with each other, and thus generates an edge line component. In addition, as has already been described, the edge line component described here includes either or both of a straight line and a curved line.

The edge line component also includes map information. The map information for an edge line component includes predetermined positions (for example, positions of a start point, a midpoint and an end point), a length and a direction of the edge line component. Further, the map information for an edge line component may include information on edge components included in the edge line component and on a relationship between the edge components (for example, the distance to the most distant edge component).

In addition, a method of generating an edge line component used in the edge line component generation unit 102 according to the present exemplary embodiment is not limited to the one described above.

For example, the edge line component generation unit 102 holds a straight line or a predetermined curved line as reference data in advance, or takes it from a storage unit not illustrated in the diagram. Next, the edge line component generation unit 102 may extract edge components located within a predetermined width range with respect to the straight or curved line, and connect them to generate an edge line component.

Alternatively, the edge line component generation unit 102 selects a certain edge component, and connects an edge component located within a certain range on the extended line of the selected edge component with the selected edge component. After the connection, the edge line component generation unit 102 further connects an edge component located within a certain range on the extended line of the connected edge component with the connected edge component. The edge line component generation unit 102 may generate an edge line component by repeating such connection operation.

Or, the edge line component generation unit 102 may combine the above-described methods to generate an edge line component.

Receiving information on an edge line component from the edge line component generation unit 102, the edge line pair component extraction unit 103 extracts a pair of edge line components (above-described edge line pair component) which are highly possible to be the edges of a string region (boundary parts between the string and background) (Step 1003).

When described in more detail, the operation of the edge line pair component extraction unit 103 is as follows.

On the basis of positions or intervals of the received edge line components, a degree of coincidence in direction between the edge line components, intensities or gradient polarities of the edge line components and a degree of coincidence in absolute value between the gradients, the edge line pair component extraction unit 103 extracts an edge line pair component which can be estimated to be a pair of edges of a string.

In addition, a method employed by the edge line pair component extraction unit 103 according to the present exemplary embodiment is not limited to the one described above.

For example, on the basis of the degree of parallelization between a pair of approximated straight lines (in the case of a straight line, it may be the line itself) for respective edge line components, that is, whether they are nearly parallel to each other or not, the edge line pair component extraction unit 103 may extract an edge line pair component. As the degree of parallelization, the edge line pair component extraction unit 103 can use an inner product of directional or normal vectors of the approximated straight lines (that is, the cosine of an angle) to perform the extraction.

Alternatively, the edge line pair component extraction unit 103 may hold information about a width estimated for a string region in advance, or receive it from a storage unit not illustrated in the diagram, and on the basis of the width information, it may extract edge line components which have a width within a predetermined range as an edge line pair component.

Alternatively, the edge line pair component extraction unit 103 may extract an edge line pair component on the basis of equality in a visual characteristic (for example, color) in the image information. For example, when a color of the image at one side of a certain edge line component is constant, the edge line pair component extraction unit 103 may extract an edge line pair component by determining another edge line component with the same color at its one side to be a corresponding edge line component.

On the basis of information on the edge line pair component extracted by the edge line pair component extraction unit 103, the string region extraction unit 104 extracts a string region including a string from the image information (Step 1004).

The string region extraction unit 104 according to the present exemplary embodiment also may use various methods as a method of extracting a string region.

For example, the string region extraction unit 104 may extract a region located between the edge lines of an edge line pair component as a string region. In this case, the extracted string region may include attribute information as information about characteristics (color, shape or pattern) of the target object.

Further, on the basis of visual characteristics such as a color and a pattern of a region located between the edge line pair component, the string region extraction unit 104 may extract a region with similar visual characteristics and with an almost the same range of width as a string region.

Alternatively, the string region extraction unit 104 may store a candidate for a string shape in advance or takes it from a storage unit not illustrated in the diagram, and thus extract a region in accordance with the shape as a string region.

Operating this way, the string region processing unit 10 extracts the string region from the image information, and outputs it to the carried item region processing unit 20.

In addition, the string region processing unit 10 is not limited to the configuration which is described above.

Figure 4:
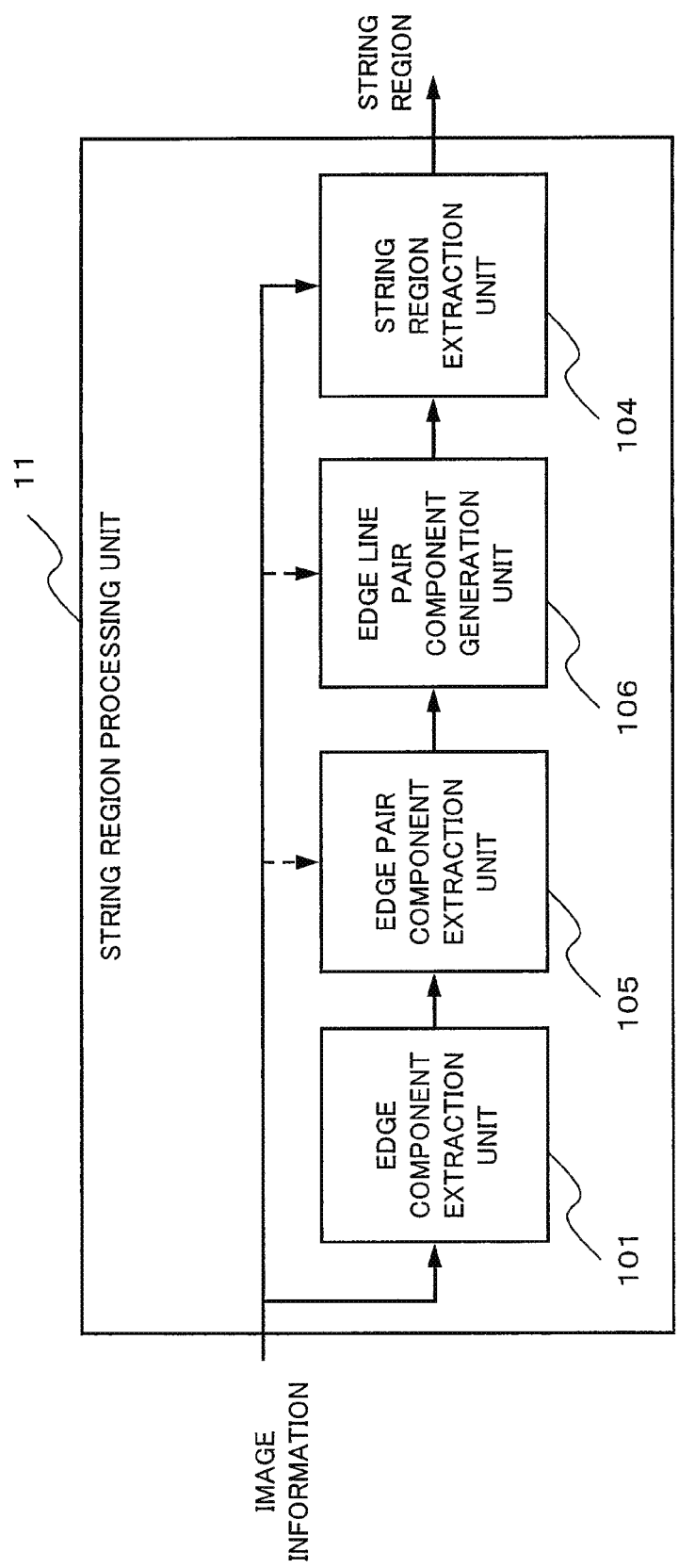
[FIG. 4] a block diagram showing another example of a string region processing unit according to the first exemplary embodiment.

FIG. 4 is a block diagram showing an example of a string region processing unit 11 with another configuration, which is also according to the first exemplary embodiment. In FIG. 4, to the same configurations as that in FIG. 2, the respective identical numbers are given.

The string region processing unit 11 includes an edge component extraction unit 101, an edge pair component extraction unit 105, an edge line pair component generation unit 106 and a string region extraction unit 104.

The edge component extraction unit 101 and the string region extraction unit 104 are the same as the edge component extraction unit 101 and the string region extraction unit 104 of the string region processing unit 10, respectively.

The edge pair component extraction unit 105 receives edge components from the edge component extraction unit 101, then extracts an edge pair component, and outputs it to the edge line pair component generation unit 106. In addition, the edge pair component extraction unit 105 may use image information in the extraction process.

On the basis of the received edge pair component, the edge line pair component generation unit 106 generates an edge line pair component and outputs it to the string region extraction unit 104. In addition, the edge line pair component generation unit 106 may use image information in the generation process.

Next, operation of the string region processing unit 11 according to the present exemplary embodiment will be described with reference to a drawing.

Figure 5:
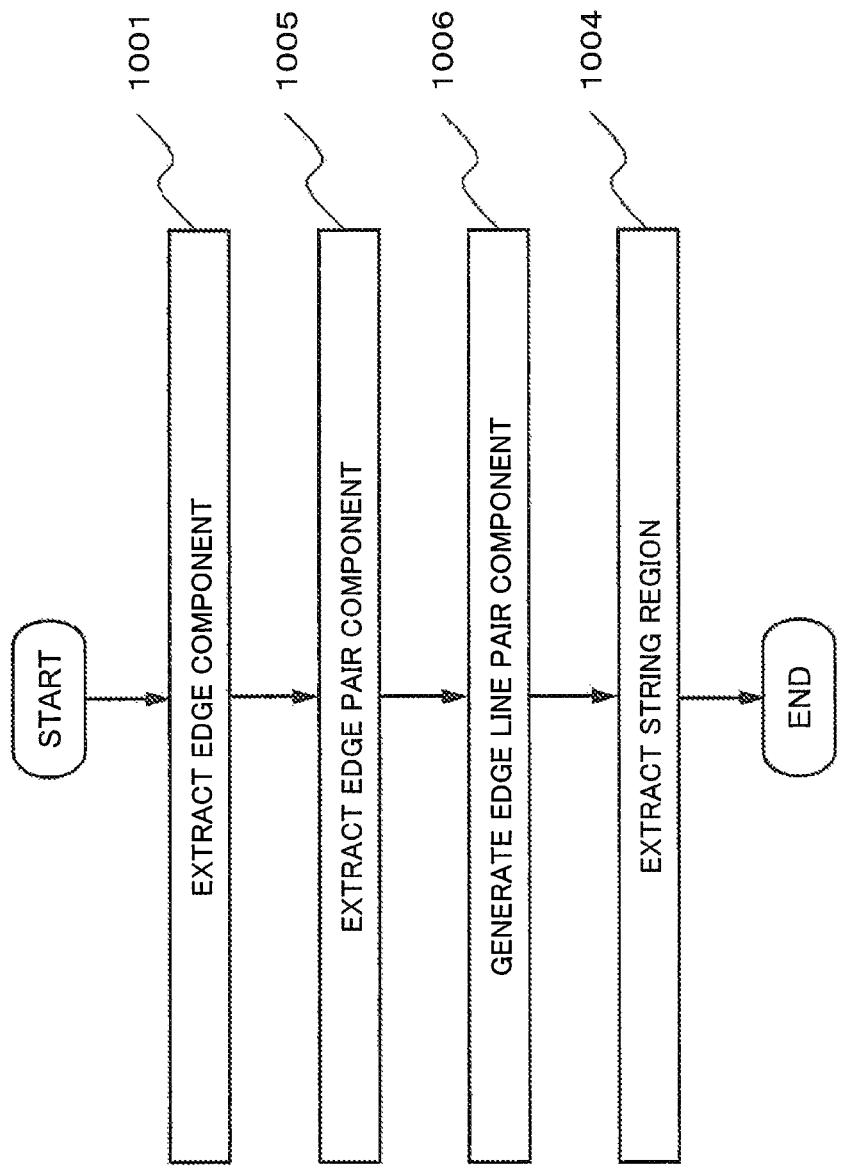
[FIG. 5] a flow chart illustrating another example of operation of a string region processing unit according to the first exemplary embodiment.

FIG. 5 is a flow chart illustrating an example of operation of the string region processing unit 11. In FIG. 5, to the same operations as that in FIG. 3, the respective identical numbers are given.

The edge component extraction unit 101 extracts an edge component from image information, similarly to the edge component extraction unit 101 of the string region processing unit 10, and outputs it to the edge pair component extraction unit 105 (Step 1001).

The edge pair component extraction unit 105 extracts, as an edge pair component, edge components which are separated from each other by a predetermined distance and are thus to be paired with each other (Step 1005).

When described specifically, this operation of the edge pair component extraction unit 105 is as follows.

The edge pair component extraction unit 105 selects, from among the received edge components, edge components which are separated from each other by a distance within a predetermined range, are almost the same in direction and are opposite in gradient or intensity. Then, on the basis of the selected edge components, the edge pair component extraction unit 105 extracts an edge pair component. However, as has been already described, either of two kinds of directions may have been determined for each edge component. Therefore, the edge pair component extraction unit 105 extracts also edge components which are separated from each other by a distance within a predetermined range, are almost opposite in direction and are almost the same in gradient or intensity for an edge pare component.

In addition, here, "almost the same in gradient or intensity" means that the absolute values are almost the same and the signs are the same, and "opposite in gradient or intensity"

means that the absolute values are almost the same but the signs are opposite to each other.

Next, on the basis of the edge pair component extracted by the edge pair component extraction unit 105, the edge line pair component generation unit 106 generates an edge line pair component for extracting a string region (Step 1006).

When described specifically, this operation is as follows.

The edge line pair component generation unit 106 generates an edge line pair component by connecting an edge pair component with another edge pair component which is located within a predetermined distance from the former one and has a directional vector of the same or opposite direction to that of the former.

In addition, as a distance between edge pair components, the edge line pair component generation unit 106 can use various kinds of distances. For example, the edge line pair component generation unit 106 may select the midpoint of either one of edge components included in each edge pair component, and thus determine a distance between the midpoints to be the distance between the corresponding edge pair components. Alternatively, the edge line pair component generation unit 106 may calculate the averaged position of midpoints of respective edge components included in each edge pair component, and thus determine a distance between the averaged positions of midpoints of edge pair components to be the distance between the corresponding edge pair components.

Alternatively, as a directional vector of an edge pair component, the edge line pair component generation unit 106 may use the directional vector of either one of edge components included in the edge pair component.

Further, the edge line pair component generation unit 106 may refer to visual characteristics (color, pattern and the like) held by pixels in the region sandwiched between edge components included in an edge pair component. For example, the edge line pair component generation unit 106 may generate an edge line pair component by connecting together edge pair components for which the regions sandwiched between edge components included in respective ones are the same or similar in color.

The string region extraction unit 104 extracts a string region on the basis of an edge line pair component, similarly to the string region extraction unit 104 of the string region processing unit 10 (Step 1004).

Next, the carried item region processing unit 20 according to the present exemplary embodiment will be described.

In addition, description will be given assuming that a carried item region extracted by the carried item region processing unit 20 according to the present exemplary embodiment is a region including the main body of a carried item. However, a carried item includes a main body and a string. Accordingly, after extracting a region of the main body of a carried item, the carried item region processing unit 20 according to the present exemplary embodiment may combine a received string region with the region of the main body and determine the resulting region to be a carried item region.

On the basis of a string region, the carried item region processing unit 20 according to the present exemplary embodiment can identify the position of a part of the main body of a carried item (a part connecting to the string) in image information. Then, on the basis of the identified position of a part of the main body of a carried item, the carried item region processing unit 20 can accurately extract a region of the main body of the carried item from the image information.

However, as has been already described, a carried item takes various positions and directions in image information.

Therefore, the carried item region processing unit 20 according to the present exemplary embodiment firstly extracts, on the basis of a string region, a carried item candidate region with a high possibility of including a carried item region from image information, and then extracts a carried item region from this carried item candidate region. The position of a carried item region included in a carried item candidate region extracted in this way on the basis of a string region can be assumed to be of a more stable position and direction than that of the position of the carried item region with respect to image information. Accordingly, the carried item region processing unit 20 according to the present exemplary embodiment, which uses a carried item candidate region, can extract a carried item region with an improved accuracy compared to extraction from the whole area of image information.

Next, a configuration of the carried item region processing unit 20 according to the present exemplary embodiment will be described with reference to a drawing.

Figure 6:
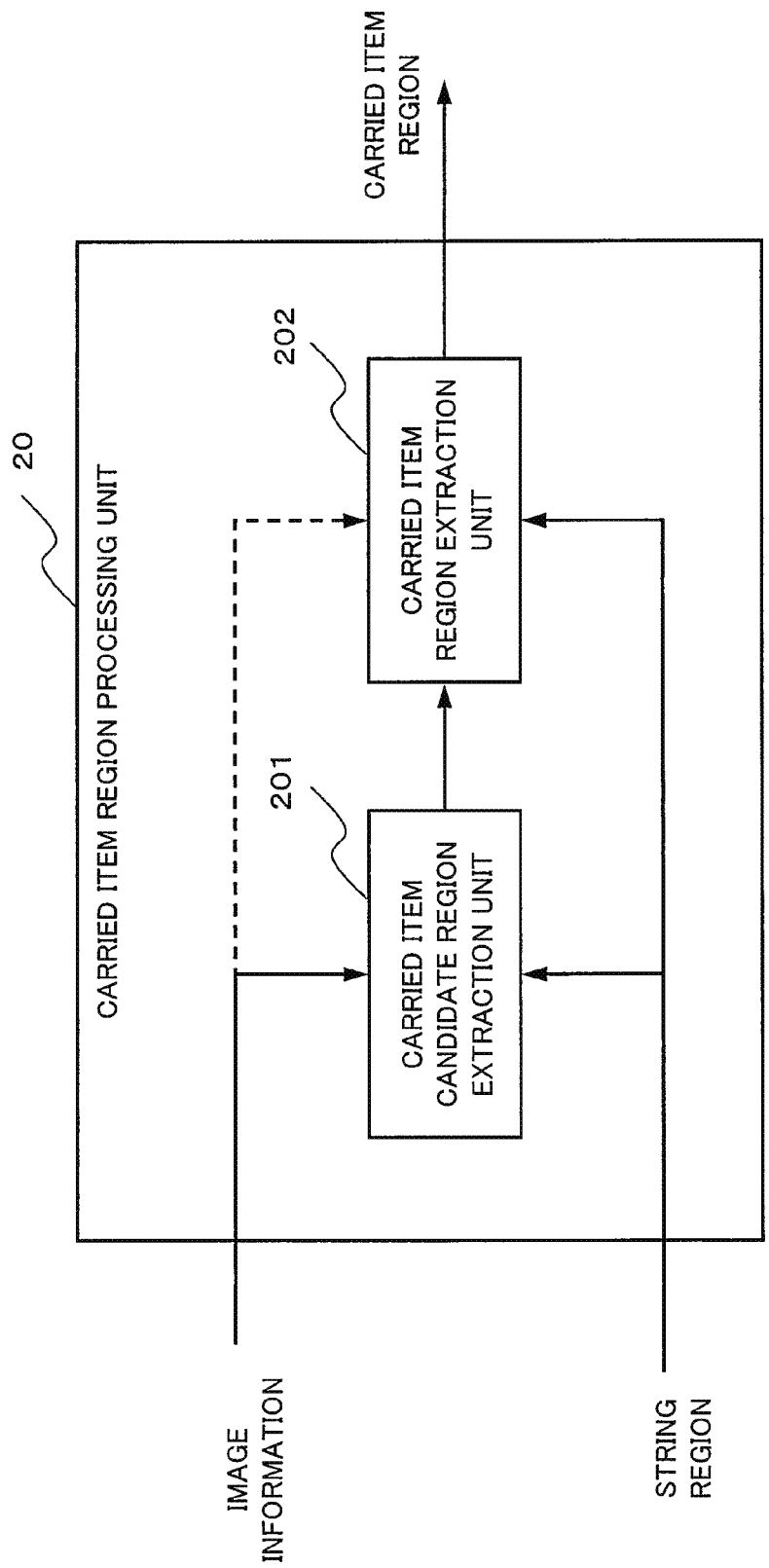
[FIG. 6] a block diagram showing an example of a carried item region processing unit according to the first exemplary embodiment.

FIG. 6 is a block diagram showing an example of a configuration of the carried item region processing unit 20 according to the first exemplary embodiment. The carried item region processing unit 20 includes a carried item candidate region extraction unit 201 and a carried item region extraction unit 202.

On the basis of a string region received from the string region processing unit 10, the carried item candidate region extraction unit 201 extracts a carried item candidate region expected to include a carried item region from image information, and outputs it to the carried item region extraction unit 202.

On the basis of the string region and the carried item candidate region, the carried item region extraction unit 202 extracts, from the carried item candidate region, a carried item region including an image of the carried item. In addition, the carried item region extraction unit 202 may refer to the image information.

Next, operation of the carried item region processing unit 20 will be described with reference to a drawing.

Figure 7:
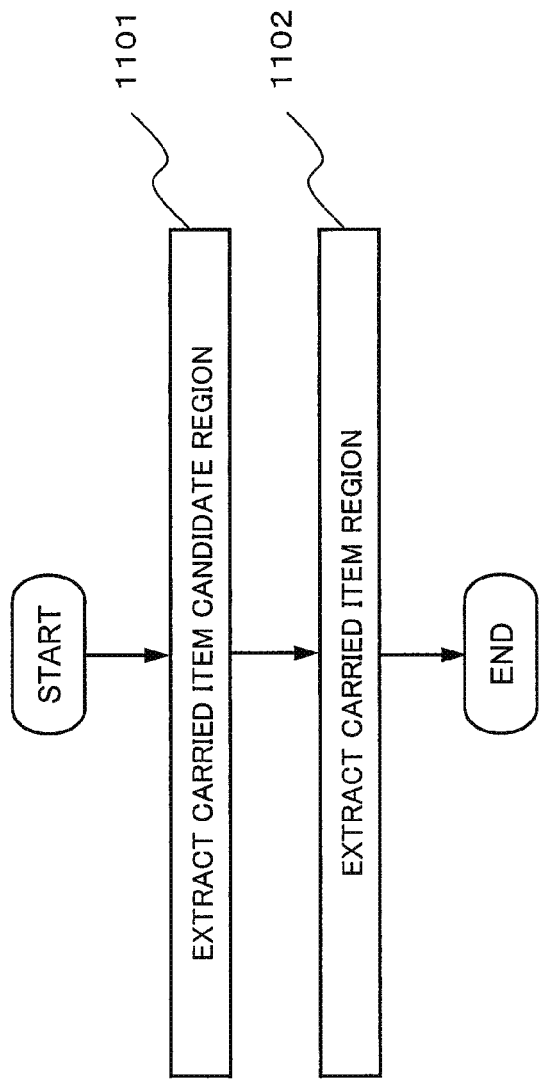
[FIG. 7] a flow chart illustrating an example of operation of a carried item region processing unit according to the first exemplary embodiment.

FIG. 7 is a flow chart illustrating an example of operation of the carried item region processing unit 20.

On the basis of a string region, the carried item candidate region extraction unit 201 extracts, from image information, a carried item candidate region including a carried item region connecting to the string, and outputs the extracted carried item candidate region to the carried item region extraction unit 202 (Step 1101).

The carried item candidate region extraction unit 201 can use various methods for this extraction of a carried item candidate region.

For example, the main body of a carried item like a shoulder bag is connected to the string and dangles from the string in the direction of gravitational force (vertical direction). Further, it is highly possible that, of the shoulder bag's main body connected to the string, an edge line directing downward in the vertical direction is on the extended line of the string in the image information, that is, in the same direction (gradient) as that of the string. Therefore, the carried item candidate region extraction unit 201 calculates the gradient of a received string region in the image information, and sets the gradient of a carried item candidate region to be the same as that of the string region.

When described specifically, this operation is as follows. The carried item candidate region extraction unit 201 calculates the gradient of a string region with respect to the X-Y axis of image information. Then, in accordance with the calculated gradient of the string region, the carried item candidate region extraction unit 201 rotates an extracting shape to be set for a carried item candidate region, and thus extracts a carried item candidate region. On the basis of such operation, the carried item candidate region extraction unit 201 can extract a carried item candidate region having high compatibility with the string region.

And, the carried item candidate region extraction unit 201 may determine a size of a carried item candidate region to be extracted, on the basis of a string region or attribute information (for example, the length or width of the string) acquired from the string region. For example, the carried item candidate region extraction unit 201 may extract a carried item candidate region by setting its size to be of a predetermined ratio to the width of the string region. Here, for example, the predetermined ratio is a ratio which is obtained on the basis of a general ratio between the string width and the main body size of a carried item (bags and the like) and by adding a margin in consideration of errors in the image information and in the string region. This ratio may be stored in the carried item candidate region extraction unit 201, or may be taken by the carried item candidate region extraction unit 201 from a storage unit not illustrated in the diagram.

Further, the carried item candidate region extraction unit 201 can use various shapes as the shape of a carried item candidate region. For example, the shape of a carried item candidate region can be assumed to be a rectangle, a bell-type shape, a trapezoid, a fan-shape and the like, which are connected to an edge of a string.

Receiving a carried item candidate region, the carried item region extraction unit 202 extracts a carried item region including a carried item on the basis of the carried item candidate region and the string region (Step 1102).

The carried item region extraction unit 202 also can use various methods.

For example, on the basis of attribute information of the string included in the received string region (information on the color or pattern of the string), the carried item region extraction unit 202 may extract a carried item region assuming that an attribute of a carried item to be extracted is a similar attribute (color or pattern).

Alternatively, on the basis of attribute information for the received string region (information on the shape, color or pattern of the string region), the carried item region extraction unit 202 may take an attribute of a carried item from a correspondence table between strings and carried items, which is stored in advance and not illustrated in the diagram, and thus extract a carried item region.

Further, the position of a carried item region with respect to a carried item candidate region can be narrowed to some extent. Accordingly, the carried item region extraction unit 202 according to the present exemplary embodiment may extract a carried item region by the use of a method such as the Bag-of-Keypoints already described.

In addition, the carried item region processing unit 20 does not need to operate in the form of having two separated processing units, the carried item candidate region extraction unit 201 and the carried item region extraction unit 202, and may be configured to have one processing unit which performs the operations of both of the separated processing units in one sequence.

And, a carried item region may include map information about the carried item region or attribute information for a carried item (for example, color or pattern).

In addition, the carried item region extraction device 1 according to the first exemplary embodiment is not limited to being of a configuration where all of the units are comprised in one device. For example, the string region processing unit 10 (or the string region processing unit 11) and the carried item region processing unit 20 may be configured as separated devices which are connected with each other by a network not illustrated in the diagram.

Alternatively, the carried item region extraction device 1 may be configured in the form where a part or the whole of a processing unit is combined with that of another processing unit into one unit.

Figure 8:
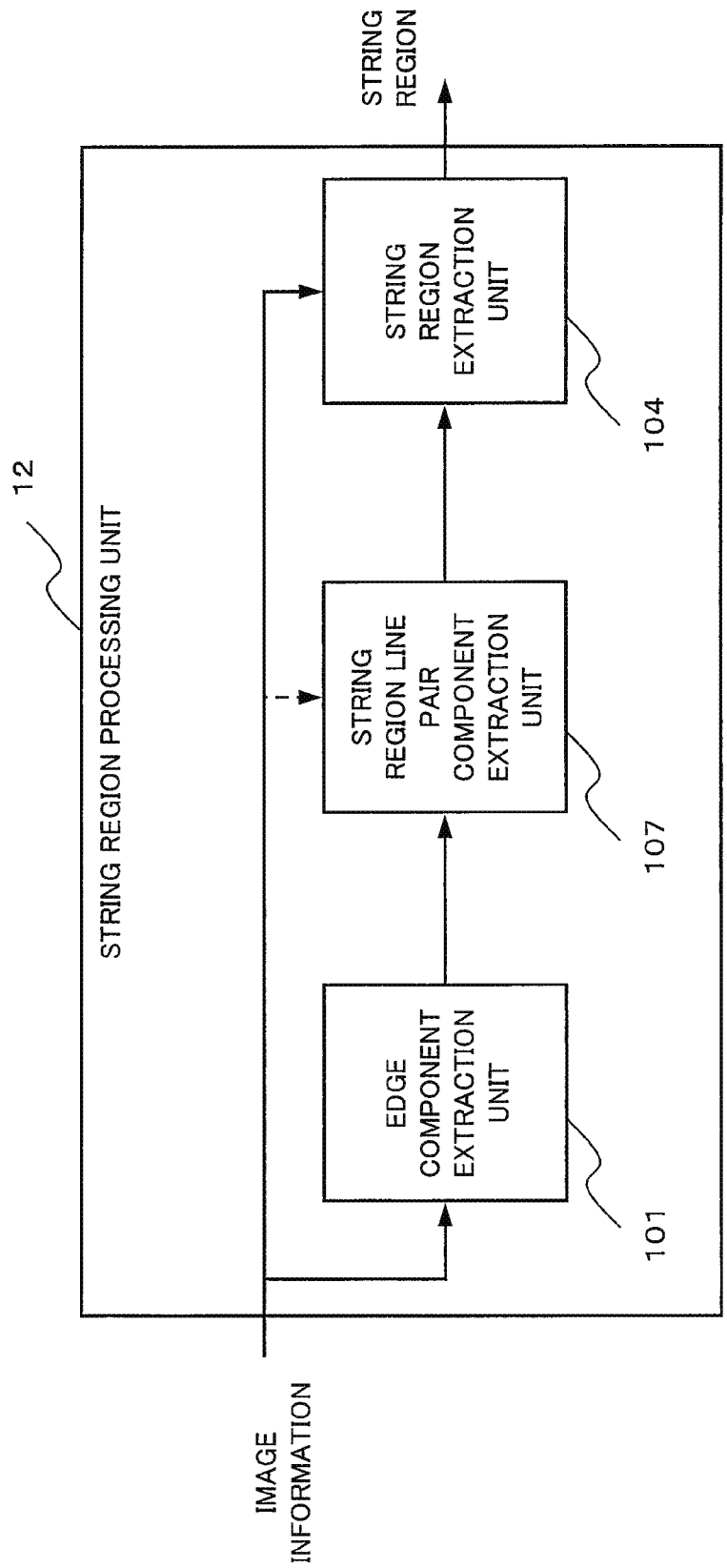
[FIG. 8] a block diagram showing still another example of a string region processing unit according to the first exemplary embodiment.

FIG. 8 is a block diagram showing an example of another configuration of the string region processing unit 10 or of the string region processing unit 11 according to the first exemplary embodiment.

A string region processing unit 12 includes an edge component extraction unit 101, a string region line pair component extraction unit 107 and a string region extraction unit 104.

The edge component extraction unit 101 and the string region extraction unit 104 are similar to, respectively, the edge component extraction unit 101 and the string region extraction unit 104 shown in FIG. 2 or FIG. 4.

The string region line pair component extraction unit 107 operates similarly to a configuration obtained by combining the edge line component generation unit 102 with the edge line pair component extraction unit 103 according to the first exemplary embodiment, or by combining the edge pair component extraction unit 105 with the edge line pair component generation unit 106 according to the second exemplary embodiment. That is, the string region line pair component extraction unit 107 extracts an edge line pair component from edge pair components.

The string region processing unit 12 of such a configuration can operate similarly to the string region processing unit 10 or the string region processing unit 11.

Further, the carried item region extraction device 1 according to the first exemplary embodiment may includes a computer such as a server or a PC (personal computer), and thus realize a part or the whole of the configuration of each processing unit in the form of a program executed by the computer.

Alternatively, each configuration of the carried item region extraction device 1 according to the present exemplary embodiment may includes a recording medium, not illustrated in the diagrams, for storing such a program executed by the computer.

On the basis of the operation described above, the carried item region extraction device 1 according to the first exemplary embodiment extracts a string region of a carried item from received image information and, on the basis of the extracted string region, extracts a carried item region.

In this way, the carried item region extraction device 1 according to the first exemplary embodiment can achieve the effect of accurately extracting a carried item region including a carried item which significantly changes its posture and direction in image information.

It is because the carried item region extraction device 1 extracts a string region which is more stable in shape than a carried item and, on the basis of the extracted string region, extracts a carried item region.

And, the carried item region extraction device 1 according to the first exemplary embodiment can achieve also the effect of accurately extracting a carried item region with no necessity of a template and the like.

It is because the carried item region extraction device 1 extracts a string region which can be accurately extracted even with no use of a template and, on the basis of the extracted string region, extracts a carried item region.

(Second Exemplary Embodiment)

The carried item region extraction device 1 according to the first exemplary embodiment extracts a string region from image information and, on the basis of the string region, extracts a carried item region. However, it is highly possible that a carried item is present in a region connecting or overlapping with a region of a human image. For this reason, the carried item region extraction device 1 can extract a string region more accurately by extracting a human image region or an image region relating to a person (hereafter, collectively referred to as a human region) from image information, and then extracting a string region on the basis of the extracted human region. In particular, if the carried item region extraction device 1 regards as a human region an image region of a specific part of a human body, such as the upper body frequently being in contact with a carried item and the shoulder or chest part where a shoulder belt is worn, and thus extracts a string region from the human region, it can extract a string region further more accurately.

A carried item region extraction device 2 according to a second exemplary embodiment extracts a human region from image information and, on the basis of the human region, extracts a string region.

First, a configuration of the carried item region extraction device 2 according to the second exemplary embodiment will be described with reference to a drawing.

Figure 9:
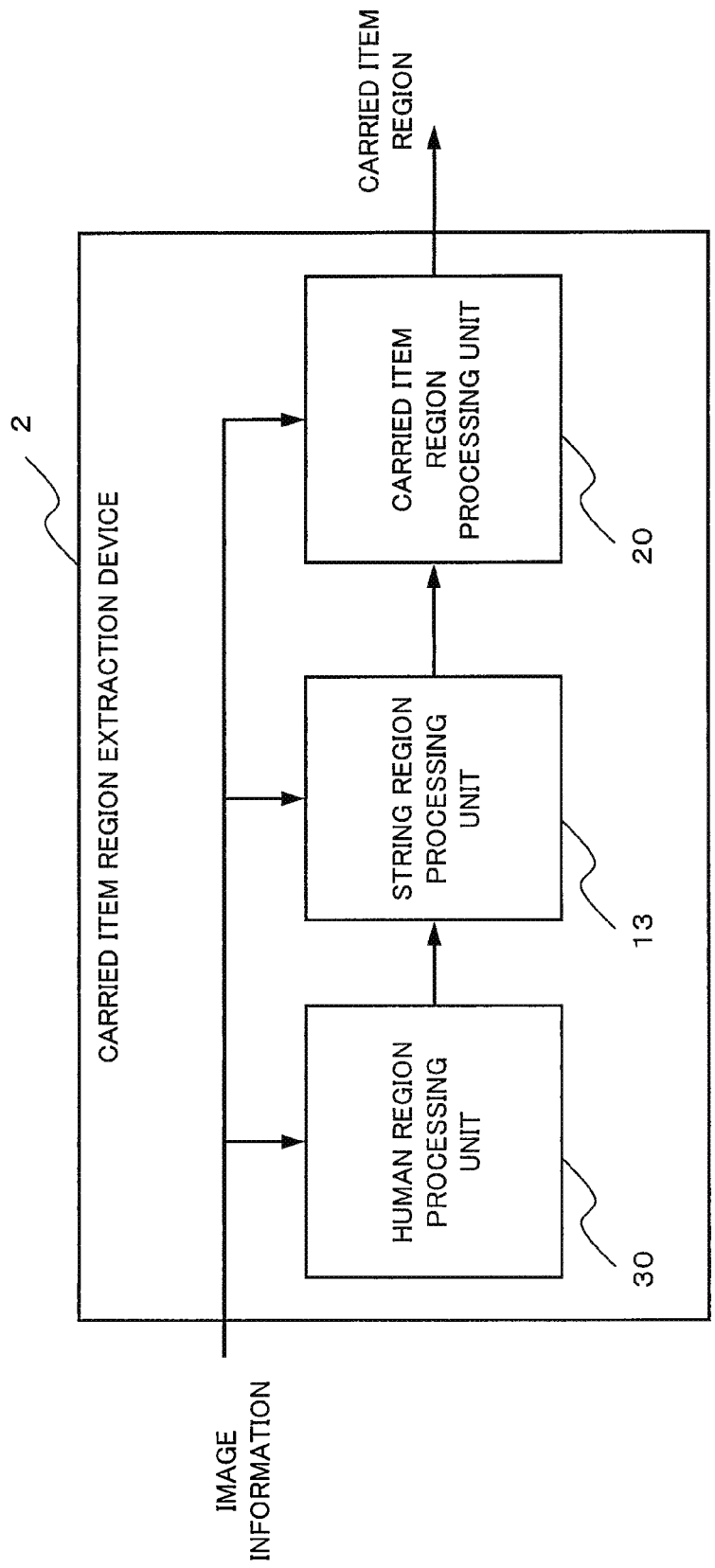
[FIG. 9] a block diagram showing an example of a carried item region processing unit according to a second exemplary embodiment.

FIG. 9 is a block diagram showing an example of the carried item region extraction device 2 according to the second exemplary embodiment. In FIG. 9, to the same configuration as that in FIG. 1, the identical numbers are given.

The carried item region extraction device 2 according to the second exemplary embodiment includes a human region processing unit 30, a string region processing unit 13 and a carried item region processing unit 20.

The carried item region processing unit 20 has the same configuration as that of the carried item region processing unit 20 according to the first exemplary embodiment, and performs the same operation, that is, extracting a carried item region on the basis of image information and a string region. Accordingly, detailed description will be omitted of the configuration and operation of the carried item region processing unit 20. However, the carried item region processing unit 20 may use a human region extracted by the human region processing unit 30, which will be described later.

The string region processing unit 13 receives a human region from the human region processing unit 30 described next and, on the basis of the human region, extracts a string region. The configuration and operation of the string region processing unit 13 are the same as that of the string region processing unit 10 according to the first exemplary embodiment if, in the latter, information used for extracting a string region is changed from the whole of image information to a human region, and hence detailed description of the configuration and operation will be omitted.

The human region processing unit 30 receives image information and extracts a human region which includes a person or an image relating to a person.

Next, a configuration of the human region processing unit 30 according to the second exemplary embodiment will be described with reference to a drawing.

In addition, in the present description of the carried item region extraction device 2 according to the second exemplary embodiment, the upper human body, particularly an image region of the chest (hereafter, referred to as a chest region) is used as a human region. However, it is used for the convenience of description, and thus, the present exemplary embodiment is not limited to it. For example, a human region that the string region processing unit 13 according to the present exemplary embodiment receives may be an image of the whole of a human body or that of another part of a human body, for example, the shoulder or the arm. And, a human region may be an image including a plurality of human parts, or a combination of a plurality of images each including a human part.

Figure 10:
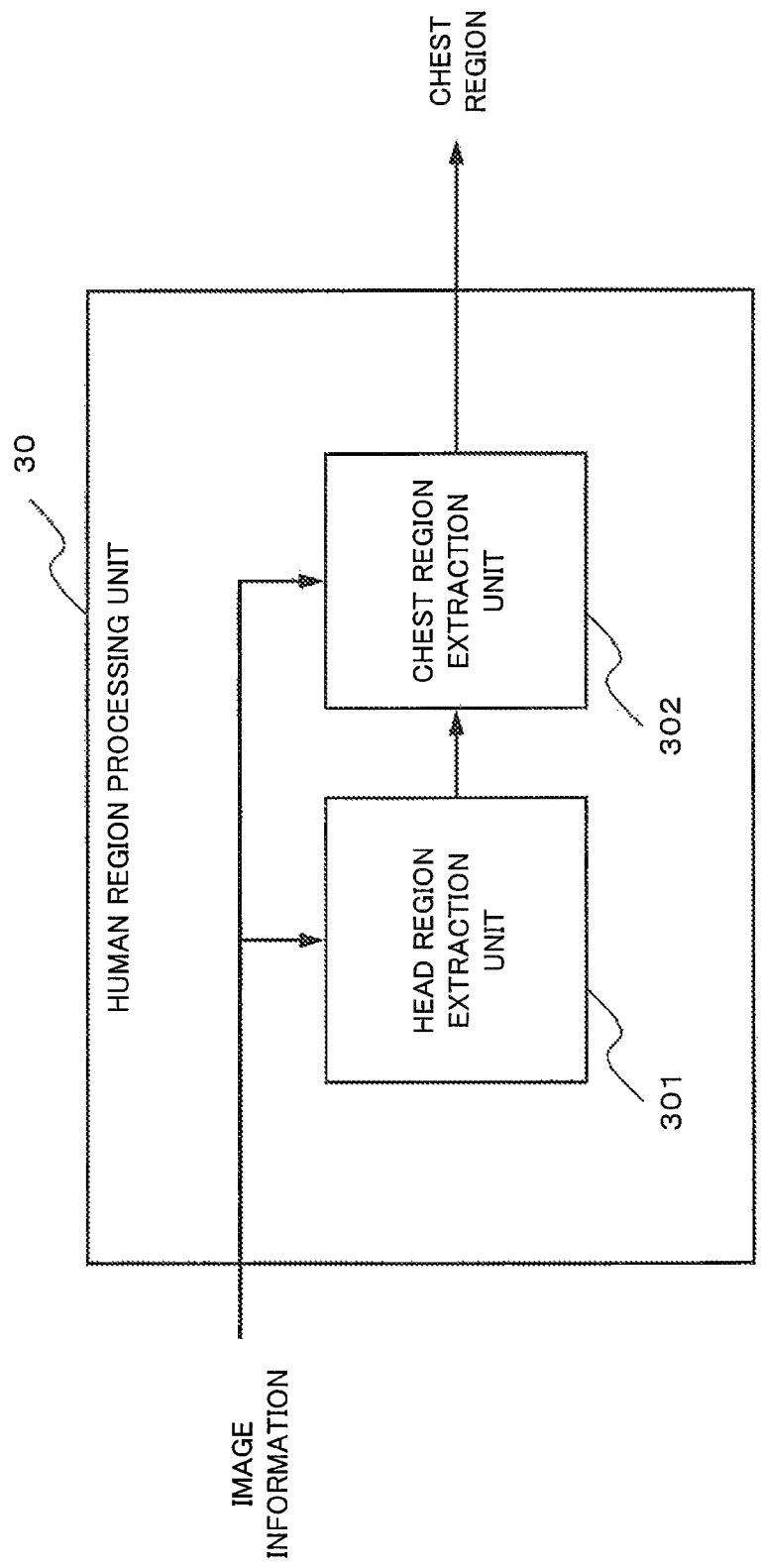
[FIG. 10] a block diagram showing an example of a human region processing unit according to the second exemplary embodiment.

FIG. 10 is a block diagram showing an example of the human region processing unit 30 according to the present exemplary embodiment.

The human region processing unit 30 according to the present exemplary embodiment may extract a chest region directly from image information. However, in the present description of the present exemplary embodiment, the human region processing unit 30 extracts an image of a region including the head or the face (hereafter, referred to as a head region), which can be accurately extracted because of its having a larger number of characteristics among images of a human, and, on the basis of the head region, extracts a chest region. In this way, the human region processing unit 30 according to the present exemplary embodiment improves accuracy of the extraction of a chest region.

The human region processing unit 30 includes a head region extraction unit 301 and a chest region extraction unit 302.

The head region extraction unit 301 extracts a head region from image information.

On the basis of the head region, the chest region extraction unit 302 extracts a chest region from the image information, and outputs it to the string region processing unit 13.

In addition, the human region processing unit 30 according to the present exemplary embodiment may output to the string region processing unit 13 a chest region with a head region included therein.

Next, operation of the human region processing unit 30 according to the second exemplary embodiment will be described with reference a drawing.

Figure 11:
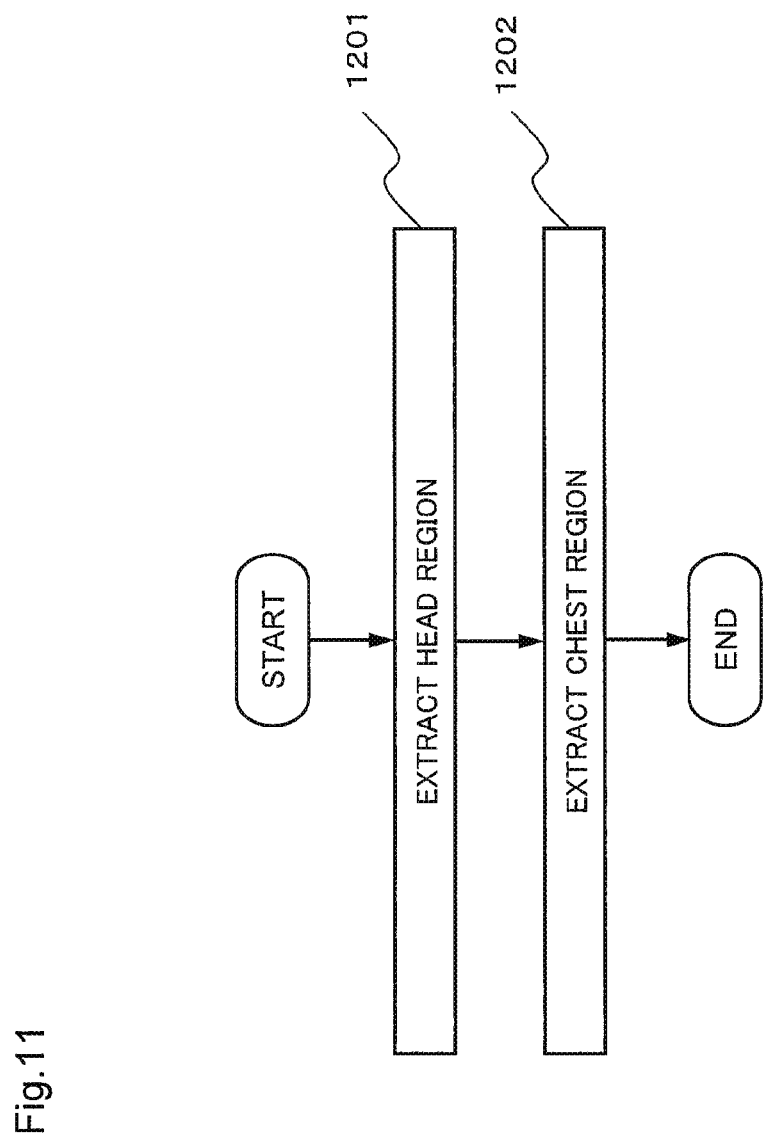
[FIG. 11] a flow chart illustrating an example of operation of a human region processing unit according to the second exemplary embodiment.

FIG. 11 is a flow chart illustrating an example of operation of the human region processing unit 30.

The head region extraction unit 301 of the human region processing unit 30 extracts a head region from image information, and outputs it to the chest region extraction unit 302 (Step 1201).

In addition, for detection of a head region or a face in the head region extraction unit 301, it is only necessary to use a general detection method (for example, the Haar-like), and thus, detail description of the detection will be omitted.

Next, on the basis of the received head region, the chest region extraction unit 302 extracts a chest region and outputs it to the string region processing unit 13 (Step 1202). The chest region extraction unit 302 can use various methods for detecting a chest region. For example, on the basis of the head region and information in the vertical direction included in the image information, the chest region extraction unit 302 may extract, as a chest region, a region connecting to the head region and being of a ratio to the head region within a predetermined range. Alternatively, the chest region extraction unit 302 may extract a chest region by extending the silhouette of the head region.

In addition, the human region processing unit 30 according to the present exemplary embodiment is not limited to the one described above.

Figure 12:
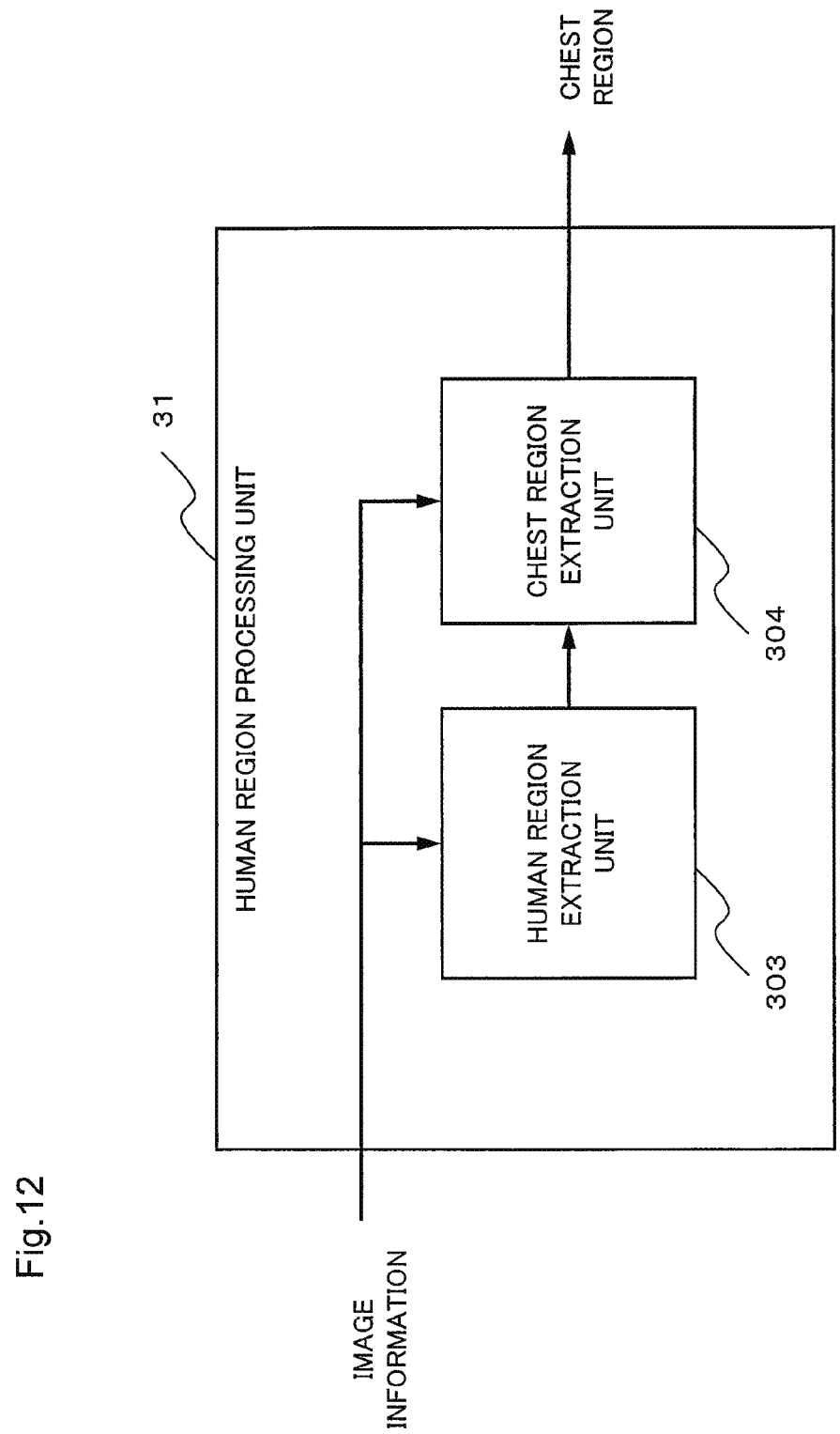
[FIG. 12] a block diagram showing another example of a human region processing unit according to the second exemplary embodiment.

FIG. 12 is a block diagram showing an example of another human region processing unit 31 according to the present exemplary embodiment.

The human region processing unit 31 includes a human region extraction unit 303 and a chest region extraction unit 304.

The human region extraction unit 303 extracts a human region including a person from image information. The human region extraction unit 303 can use various methods for extracting a human region from image information.

For example, when an installed position of a camera is a gate of a company building for employees' entering and leaving and image information is a moving image, a moving object included in the moving image (image information) is a human. Therefore, the human region extraction unit 303 extracts a region of a moving object in image information using background subtraction or frame subtraction, and extracts the region of a moving object as a human region.

In this way, the human region extraction unit 303, which has thus extracted a human region, outputs the extracted human region to the chest region extraction unit 304.

Receiving the human region from the human region extraction unit 303, the chest region extraction unit 304 extracts a chest region from the image information. The chest region extraction unit 304 can use various methods.

For example, on the assumption that the total height of a human body equals to a predetermined number of times the head length, the chest region extraction unit 304 may equally divide a human region into the predetermined number of pieces (for example, eight equal pieces), and extract a region of the piece of a designated number counted from the top (for example, a region of the second or third piece) as a chest region.

Alternatively, the chest region extraction unit 304 may recognize widths of a human region from above, determine a part with a large width to be the shoulder, and thus extract a region below the part as a chest region.

The human region processing unit 31, which has extracted the chest region, outputs it to the string region processing unit 13.

Figure 13:
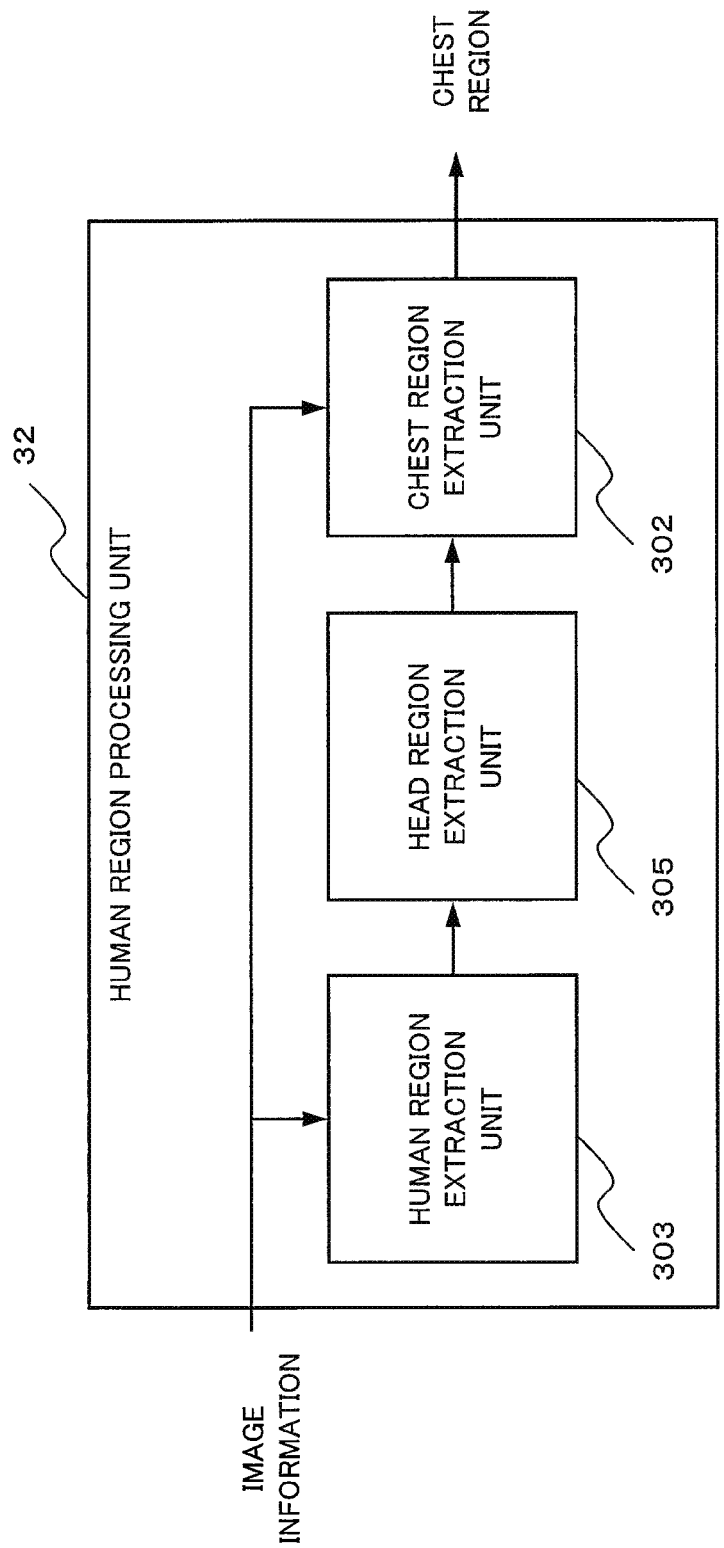
[FIG. 13] a block diagram showing still another example of a human region processing unit according to the second exemplary embodiment.

FIG. 13 is a block diagram showing an example of still another human region processing unit 32 according to the present exemplary embodiment.

The human region processing unit 32 includes a human region extraction unit 303, a head region extraction unit 305 and a chest region extraction unit 302.

The human region extraction unit 303 shown in FIG. 13 extracts a human region similarly to the human region extraction unit 303 shown in FIG. 12.

The head region extraction unit 305 extracts a head region on the basis of the human region. Since the head region extraction unit 305 extracts a head region on the basis of a human region, it can improve the accuracy of extracting a head region compared to the head region extraction unit 301 shown in FIG. 10, which extracts a human region from the whole of image information.

The chest region extraction unit 302 shown in FIG. 13 extracts a chest region from the head region similarly to the chest region extraction unit 302 shown in FIG. 10. However, since the accuracy of the head region is improved as has been described above, the chest region extraction unit 302 shown in FIG. 13 can extract a chest region with improved accuracy compared to the chest region extraction unit 302 shown in FIG. 10.

On the basis of such operation, the human region processing unit 32 extracts a human region (a chest region in this description of the present exemplary embodiment) and outputs it to the string region processing unit 13.

The string region processing unit 13 having received the human region extracted by the human region processing unit 30 extracts a string region on the basis of the region designated as a human region in the image information, and outputs it to the carried item region processing unit 20.

In the string region processing unit 13, compared to the string region processing unit 10 according to the first exemplary embodiment, a range used in the extraction process is changed from the whole of image information to a human region with higher possibility of including a string region and with a narrower range. As a result, in the string region processing unit 13 according to the second exemplary embodiment, the accuracy of the extraction is improved and the time necessary for the extraction becomes shorter, compared to the string region processing unit 10 according to the first exemplary embodiment.

In addition, because a string may protrude beyond a human image region, the string region processing unit 13 does not need to limit a string region to be outputted to the carried item region processing unit 20 to the range of a human region. On the basis of a human region, the string region processing unit 13 may extend a string region to outside the human region and send the extended string region to the carried item region processing unit 20.

In addition, since the accuracy of string region extraction is also improved, in the carried item region processing unit 20 according to the second exemplary embodiment, the accuracy of carried item region extraction is improved compared to the carried item region processing unit 20 according to the first exemplary embodiment.

In this way, in addition to the effect of the first exemplary embodiment, the carried item region extraction device 2 according to the second exemplary embodiment can achieve the effect of extracting a carried item region of higher accuracy.

It is because since the carried item region extraction device 2 extracts a string region on the basis of a human region with high possibility of a string's existence therein, it can improve the accuracy of string region extraction. Then, since the carried item region extraction device 2 extracts a carried item region using the string region of high accuracy, it can extract a carried item region also with high accuracy.

(Third Exemplary Embodiment)

While the carried item region extraction device 1 of the first exemplary embodiment extracts a carried item region in image information, it is possible to identify a carried item on the basis of the extracted carried item region.

A carried item region extraction device 3 according to a third exemplary embodiment identifies a carried item.

Figure 14:
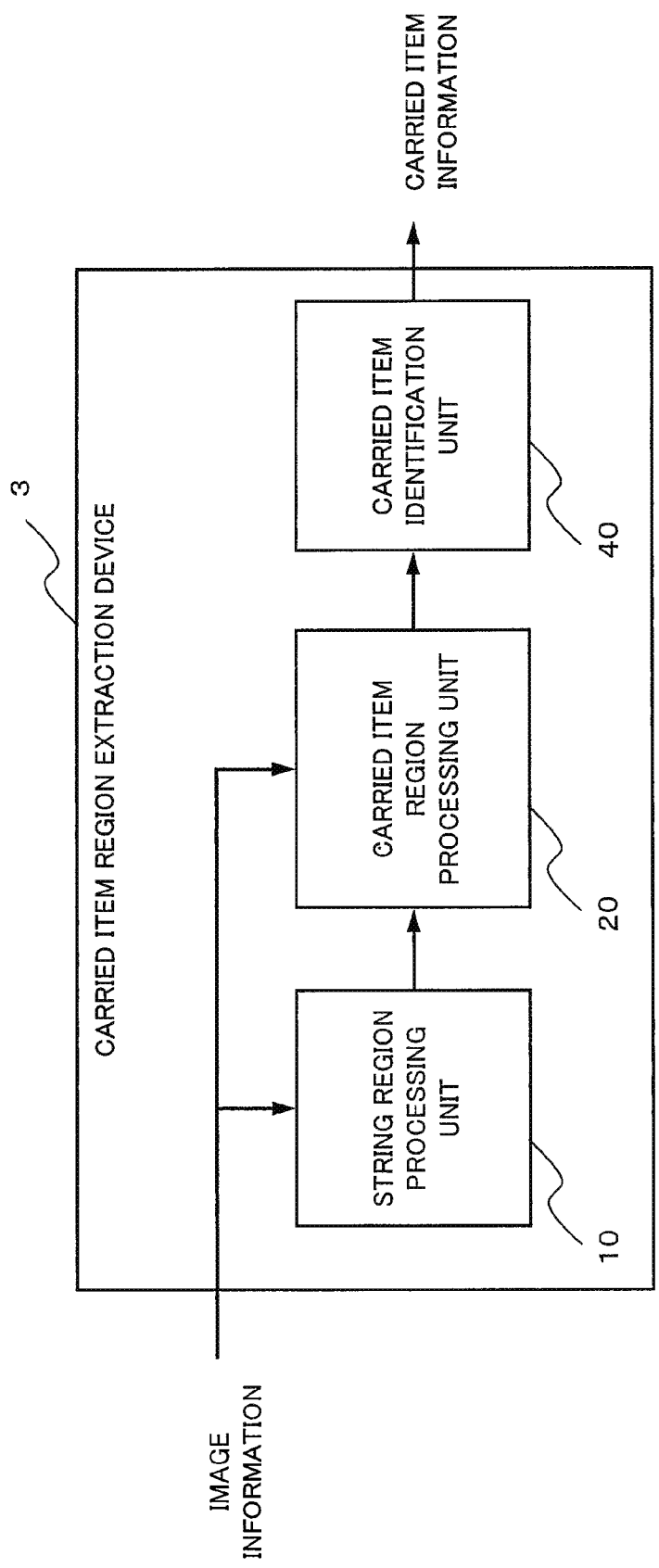
[FIG. 14] a block diagram showing an example of a carried item region extraction device according to a third exemplary embodiment.

FIG. 14 is a block diagram showing an example of a configuration of the carried item region extraction device 3 according to the third exemplary embodiment. In FIG. 14, the respective identical numbers are given to the same configurations as that in FIG. 1.

The carried item region extraction device 3 includes a string region processing unit 10, a carried item region processing unit 20 and a carried item identification unit 40.

Because the string region processing unit 10 and the carried item region processing unit 20 are the same as that of the first exemplary embodiment, detailed description of their configurations and operation will be omitted.

The carried item identification unit 40 receives a carried item region from the carried item region processing unit 20 and identifies a carried item included in the carried item region. In addition, a result of this identification is referred to as carried item information.

The carried item identification unit 40 can use various methods as a method for the carried item identification.

For example, the carried item identification unit 40 stores, in advance in a storage unit not illustrated in the diagram, data including characteristic information (color, pattern, size, shape and the like) for carried items and information represented by the carried items (names, model numbers and the like). Then, the carried item identification unit 40 calculates a degree of similarity between the stored characteristic information for carried items and data on a carried item region, and identifies the carried item by determining characteristic information giving the highest degree of similarity to be information representing the carried item.

In addition, there is no particular limit on the characteristic information for carried items as long as it is information for identifying a carried item. However, because the carried item identification unit 40 identifies a carried item on the basis of image information, as the characteristic of a carried item, an image-related characteristic quantity representing a visual characteristic (for example, color, pattern, shape, silhouette or size) can be assumed.

And, the carried item identification unit 40 of the present exemplary embodiment can use various methods as a method for determining a degree of similarity. For example, the carried item identification unit 40 may calculate two-dimensional correlation of image information, and also may use the repetition style of a pattern or a changing rate of gradation.

In addition, when there are plural carried items giving the same degree of similarity, the carried item identification unit 40 may output the plurality of candidates for a carried item to a display device not illustrated in the diagram, thus making possible selection from them.

And, the carried item identification unit 40 may identify a carried item using a string region, in addition to a carried item region. For example, the carried item identification unit 40 may narrow candidates for a carried item on the basis of the width or length of a string region, or on the basis of the pattern of the string region.

In addition, the carried item region extraction device 3 according to the third exemplary embodiment may include the human region processing unit 30 moreover.

In this way, the carried item region extraction device 3 according to the third exemplary embodiment can achieve the effect of identifying a carried item, in addition to the effect of the first exemplary embodiment.

It is because the carried item region extraction device 3 includes the carried item identification unit 40, which identifies a carried item on the basis of a carried item region and characteristic information for carried items, and thus identifies a carried item (carried item information) from the carried item region.

(Fourth Exemplary Embodiment)

The carried item region extraction device 3 according to the third exemplary embodiment extracts carried item information. This carried item information can be reference information for identifying a person holding the carried item.

On the basis of information on an identified carried item (carried item information), a carried item region extraction device 4 according to a fourth exemplary embodiment identifies an owner of the carried item.

Figure 15:
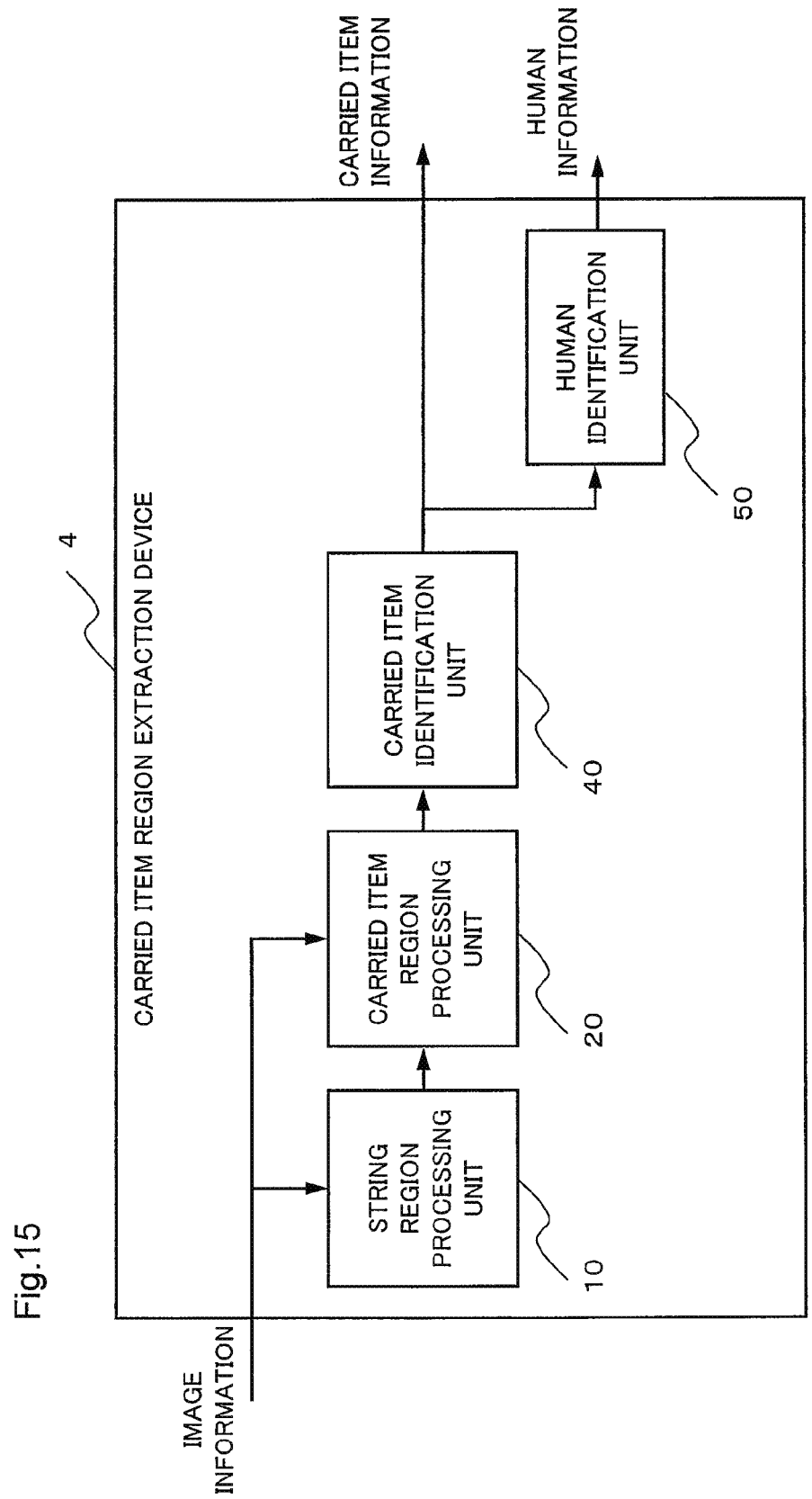
[FIG. 15] a block diagram showing an example of a carried item region extraction device according to a fourth exemplary embodiment.

FIG. 15 is a block diagram showing an example of a configuration of the carried item region extraction device 4 according to the fourth exemplary embodiment. In FIG. 15, the respective identical numbers are given to the same configurations as that in FIG. 14, and their detailed description will be omitted.

The carried item region extraction device 4 includes a string region processing unit 10, a carried item region processing unit 20 and a carried item identification unit 40, which are the same as that of the carried item region extraction device 3 according to the third exemplary embodiment, and further includes a human identification unit 50.

Because the string region processing unit 10, the carried item region processing unit 20 and the carried item identification unit 40 are the same as that of the carried item region extraction device 3 of the third exemplary embodiment, detailed description of their configurations and operation will be omitted.

The human identification unit 50 receives carried item information from the carried item identification unit 40, and identifies a person on the basis of information on correspondence between a person and a carried item stored in a storage unit not illustrated in the diagram.

For example, when carried item information received from the carried item identification unit 40 represents a carried item only a specific person holds (such as a work bag for a specific business or a bag with a company name), the human identification unit 50 identifies a person holding the carried item on the basis of the information stored in the storage unit. Thus, the human identification unit 50 can identify a person from carried item information. In addition, this result is referred to as human information.

In this way, the carried item region extraction device 4 according to the fourth exemplary embodiment can achieve the effect of identifying a person holding a carried item moreover, in addition to the effect of the carried item region extraction device 3 according to the third exemplary embodiment.

It is because the carried item region extraction device 4 identifies a person holding a carried item (human information) on the basis of identified carried item information.

(Fifth Exemplary Embodiment)

In the fourth exemplary embodiment, a person is identified from a carried item. However, a person holding a carried item can be also information for identifying the carried item. And, as an identification card or a passage permission card for a building, generally used is an IC card storing information for identification of the holder (identification information or ID information). Further, information for identification (hereafter, these are collectively referred to as ID information) such as in the form of an RFID (Radio Frequency Identification) is attached also to an article. Using this ID information, the carried item region extraction device 1 can improve the accuracy of extraction.

A carried item region extraction device 5 according to a fifth exemplary embodiment uses ID information in its extraction process.

Figure 16:
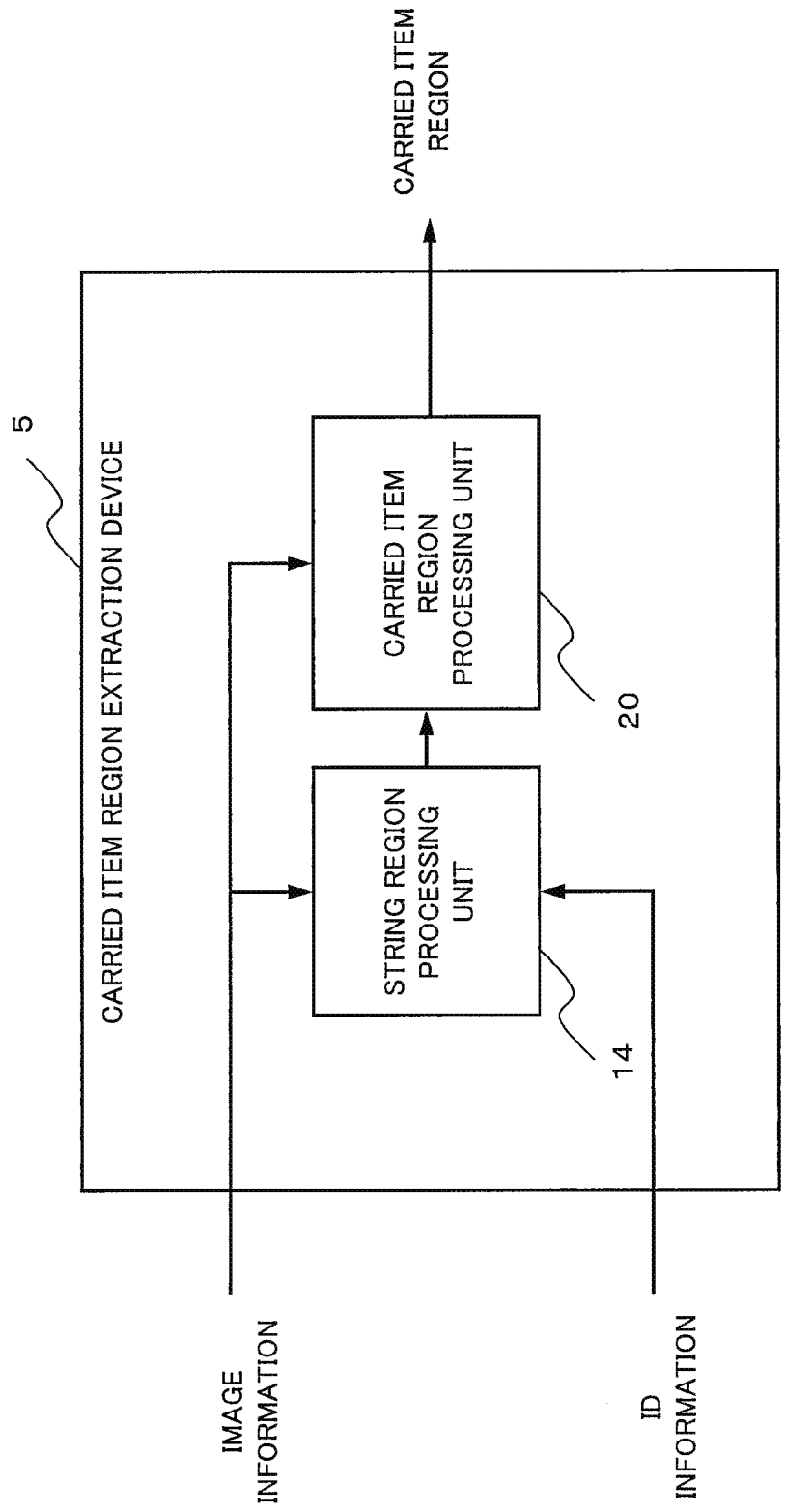
[FIG. 16] a block diagram showing an example of a carried item region extraction device according to a fifth exemplary embodiment.

FIG. 16 is a block diagram showing an example of a configuration of the carried item region extraction device 5 according to the fifth exemplary embodiment.

In FIG. 16, the identical numbers are given to the same configuration as that in FIG. 1.

The carried item region extraction device 5 according to the fifth exemplary embodiment includes a string region processing unit 14 and a carried item region processing unit 20.

Because the carried item region processing unit 20 is the same in configuration and operation as the carried item region processing unit 20 according to the first exemplary embodiment, its detailed description will be omitted.

The string region processing unit 14 receives image information and further receives ID information from an ID information detector not illustrated in the diagram.

Then, the string region processing unit 14 transmits the ID information to a human database or a carried item database, which are not illustrated in the diagram, and receives information about an attribute of a person or that about an attribute of a carried item. Here, the information about an attribute of a person is, for example, the gender, the age or a physical characteristic (the height or the width and thickness of the chest). And, the information about an attribute of a carried item is, for example, the model number, manufacturer name or material of a bag.

In addition, the string region processing unit 14 may receive information about an attribute of a person or of a carried item from the ID information detector, instead of receiving ID information.

Then, using the received information about an attribute of a person or of a carried item in the extraction of a string region already described, the string region processing unit 14 extracts a string region from image information.

For example, a child often wears a bag slantingly. Accordingly, if an attribute of a person is a child, the string region processing unit 14 extracts a string region assuming it to be a slanted region. On the other hand, an adult man often hangs a bag over one of his shoulders. Therefore, if an attribute of a person is an adult man, the string region processing unit 14 extracts a string region assuming it to be a region directing nearly vertically.

Alternatively, the string region processing unit 14 may acquire, for example, information on the shape of a string as an attribute of a carried item, and thus extract a string region according to the shape. Further, on the basis of the information on the shape of a string, the string region processing unit 14 may change a method for extracting a string region.

In this way, the string region processing unit 14 according to the fifth exemplary embodiment can extract a string region of improved accuracy.

As a result, because the carried item region processing unit 20 according to the fifth exemplary embodiment extracts a carried item region on the basis of the string region of improved accuracy, it can improve the accuracy of the extraction.

In addition, the use of ID information is not limited to in the string region processing unit 14. The carried item region processing unit 20, the human region processing unit 30, the carried item identification unit 40 and also the internal configurations included in them may operate referring to various kinds of information obtained on the basis of ID information.

For example, the human region processing unit 30 may acquire the gender of a person and, if it is male, extract a wider chest region and, if female, extract a narrower one.

And, on the basis of the gender, the carried item region processing unit 20 may extract, as a carried item region, a quadrangle shape like an attache case if the gender is male, and a shape nearly trapezoidal or circular like a handbag if female.

Similarly, on the basis of the gender, the carried item identification unit 40 may determine, to be a high-ranking candidate for a carried item, an attache case or a briefcase if the gender is male, and a handbag or a carrying bag if female.

In this way, the carried item region extraction device 5 according to the fifth exemplary embodiment can achieve the effect of extracting a carried item region with further higher accuracy compared to the carried item region extraction device 1 according to the first exemplary embodiment.

It is because the carried item region extraction device 5 acquires, on the basis of ID information, information on a person holding a carried item or on the carried item, and thus can improve the accuracy of extracting a carried item region by referring to the acquired information.

(Sixth Exemplary Embodiment)

The carried item region extraction device 1 according to the first exemplary embodiment extracts a string region. On the basis of the string region, the carried item region extraction device 1 can identify the type of the string and then extract a carried item region using the string type.

A carried item region extraction device 6 according to a sixth exemplary embodiment identifies the string type of a carried item on the basis of an extracted string region, and then extracts a carried item region using also the string type.

Figure 17:
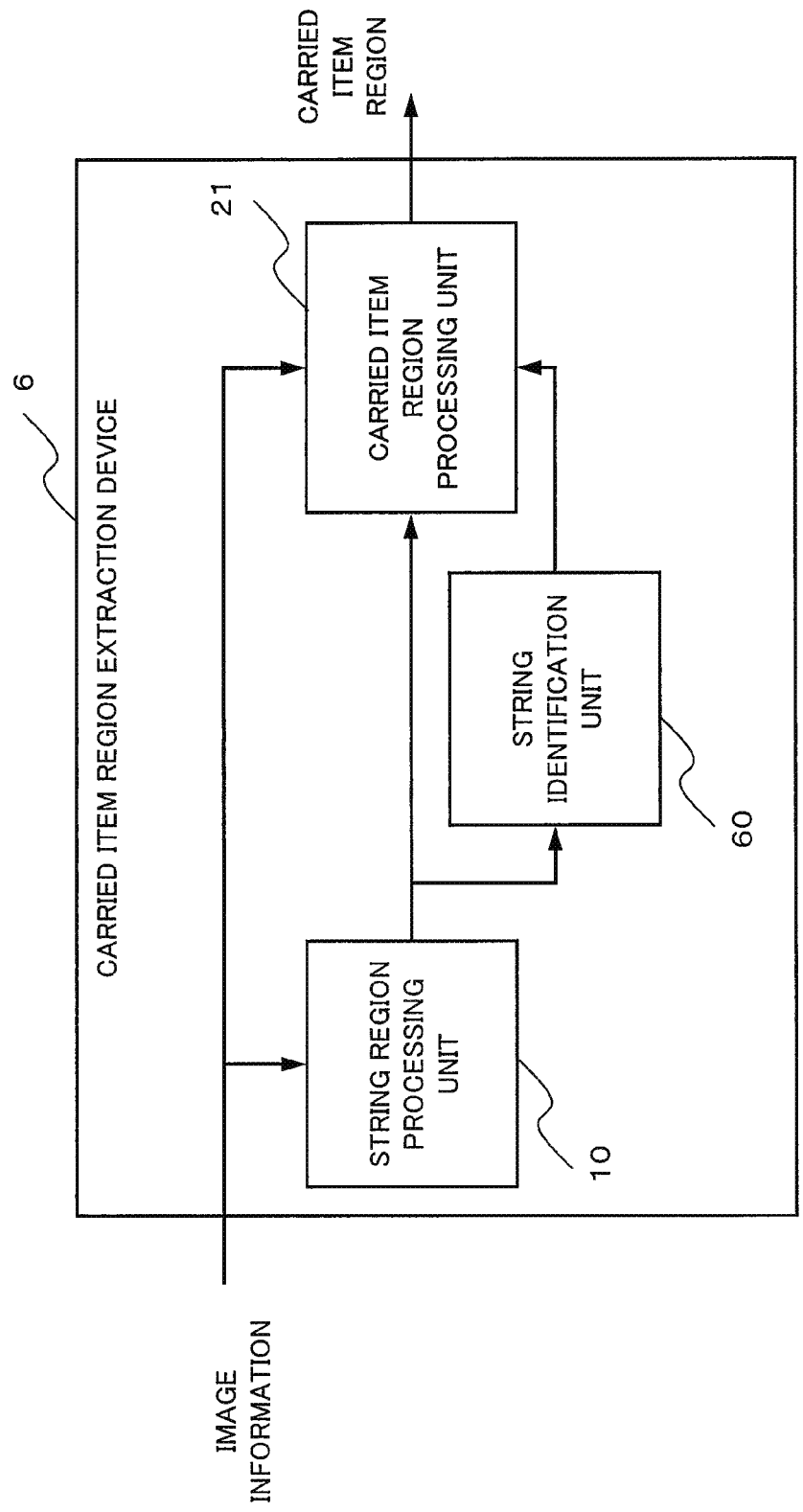
[FIG. 17] a block diagram showing an example of a carried item region extraction device according to a sixth exemplary embodiment.

FIG. 17 is a block diagram showing an example of a configuration of the carried item region extraction device 6 according to the sixth exemplary embodiment. In FIG. 17, the identical numbers are given to the same configuration as that in FIG. 1.

The carried item region extraction device 6 includes a string region processing unit 10 and a carried item region processing unit 21, and further includes a string identification unit 60.

Because the string region processing unit 10 is the same as the string region processing unit 10 according to the first exemplary embodiment, detailed description of its configuration and operation will be omitted.

The string identification unit 60 receives a string region from the string region processing unit 10 and identifies a string included in this string region. A result of the identification is referred to as string information.

As for the identification, the string identification unit 60 may identify a string itself (for example, the string of bag B of company A) or a string type (flat belt, circular string, chain and the like).

And, the string identification unit 60 can use various methods as a method for the identification. For example, when an image pattern included in a string region is uniform, the string identification unit 60 identifies the string as a flat string. And, when the figure of a pattern (for example, a circle) changes its shape little in the central portion of a string and it changes more (from circular to elliptic) with coming closer to an edge portion symmetrically with respect to the center, the string identification unit 60 identifies the string as a string with a curved cross-section (for example, circular or semicircular). Further, when a circular or elliptic figure is repeated in a string region, the string identification unit 60 identifies the string as a chain-like string. The string identification unit 60 outputs information on an identified string (string information) to the carried item region processing unit 21.

The carried item region processing unit 21 extracts a carried item region on the basis of a string region and of string information. For example, because a flat and wide string can be assumed to be a string to hold a thick carried item, the carried item region processing unit 21 may extract a carried item region assuming a thick quadrangle bag as a carried item. And, when a string is thin or is a chain, the carried item region processing unit 21 may extract a carried item region assuming a bag for ladies.

In this way, on the basis of a string region and string information, the carried item region processing unit 21 according to the sixth exemplary embodiment can improve the accuracy of the extraction, compared to the carried item region processing unit 20 according to the first exemplary embodiment.

In addition, the carried item region extraction device 6 may includes any one, or two or more, of the human extraction unit 30, the carried item identification unit 40 and the human identification unit 50.

In this way, the carried item region extraction device 6 according to the sixth exemplary embodiment can achieve the effect of extracting a carried item region with further higher accuracy, in addition to the effect of the carried item region extraction device 1 according to the first exemplary embodiment.

It is because the carried item region extraction device 6 includes the string identification unit 60 which identifies the string of a carried item on the basis a string region. Then, because the carried item region processing unit 21 extracts a carried item region using string information identified by the string identification unit 60, in addition to the string region, it can improve the accuracy of the extraction.

(Seventh Exemplary Embodiment)

When there is little change of entering and leaving people such as at school, it can be assumed that a change of a carried is little. The carried item region extraction device 1 used at such a place can improve the accuracy and time of extracting a carried item region by learning function which stores information extracted or generated by each processing unit and refers to it in the next identification or extraction.

A carried item region extraction device 7 according to a seventh exemplary embodiment is equipped with a function (learning function) to store and use extracted information.

In addition, for the convenience of description, the learning function in the seventh exemplary embodiment will be described included in the string region processing unit 15. However, the present exemplary embodiment is not limited to it. Any one, or two or more, of a carried item region processing unit 20, a human region processing unit 30, a carried item identification unit 40, a human identification unit 50 and a string identification unit 60 may include the learning function.

Figure 18:
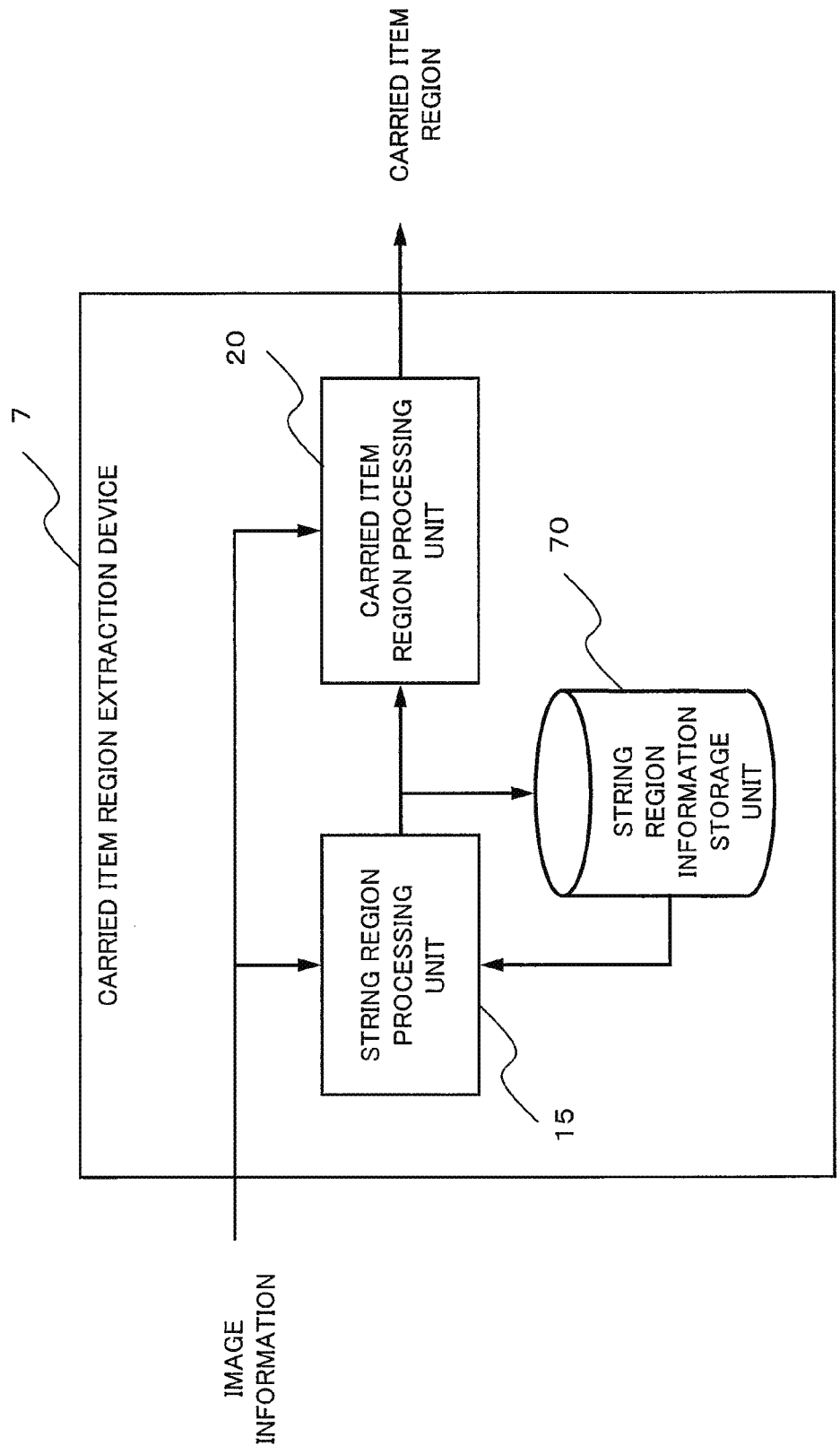
[FIG. 18] a block diagram showing an example of a carried item region extraction device according to a seventh exemplary embodiment.

FIG. 18 is a block diagram showing an example of the carried item region extraction device 7 according to the seventh exemplary embodiment. In addition, in FIG. 18, the identical numbers are given to the same configuration as that in FIG. 1, and their detailed description will be omitted.

The carried item region extraction device 7 according to the seventh exemplary embodiment includes a string region processing unit 15 and a carried item region processing unit 20, and further includes a string region information storage unit 70.

Because the carried item region processing unit 20 is the same in configuration and operation as the carried item region processing unit 20 according to the first exemplary embodiment, its detailed description will be omitted.

The string region processing unit 15 sends information generated by its operation of extracting a string region to the string region information storage unit 70, thus storing the information therein. Then, the string region processing unit 15 uses the information stored in the string region information storage unit 70 in its operation of extracting a string region.

Thus, the information stored in the string region information storage unit 70 is information to be used by the string region processing unit 15 to extract a string region. Accordingly, the string region processing unit 15 does not need to store in the string region information storage unit 70 a string region to be sent to the carried item region processing unit 20, but may store information at an intermediate stage of its extraction process, for example, an edge component or an edge pair component. Alternatively, the string region processing unit 15 may store in the string region information storage unit 70 a string region with other information included therein, or information on a part of the string region. In addition, the string region processing unit 15 may store information about a plurality of string regions of carried items in the string region information storage unit 70.

The string region information storage unit 70 stores or updates the information received from the string region processing unit 15, and outputs the stored information to the string region processing unit 15 as necessary.

Next, an operation of the carried item region extraction device 7 thus configured will be described.

In addition, when the string region processing unit 15 extracts a string region, its operations other than that of using information stored in the string region information storage unit 70 are the same as that in the first exemplary embodiment, and hence description of the same operations will be omitted.

When the string region processing unit 15 extracts a string region, it refers to information about a string region stored in the string region information storage unit 70.

As an example of this operation, the case where the operation is applied to extraction of an edge line pair component shown as the Step 1003 in FIG. 3 will be described.

When the string region processing unit 15 extracts an edge line pair component, it refers to the width of an edge line pair component stored in the string region information storage unit 70 as the width of edge line components to be combined into a pair and, on the basis of the width, determines whether or not an edge line pair component can be extracted. If the extraction can be performed, the string region processing unit 15 extracts a string region on the basis of the extracted edge line pair component. In this way, the string region processing unit 15 extracts a string region using information stored in the string region information storage unit 70. It is highly possible that the stored information is close to information on a carried item to be extracted. That is, it is highly possible that the difference between the stored information and extracted information is small. Accordingly, if the string region processing unit 15 performs on the basis of the stored information, it is highly possible that the extraction is performed in a shorter time period than the case of extraction from the whole of image information.

As a result, the carried item region extraction device 7 can extract a carried item region in a shorter time period compared to the carried item region extraction device 1 according to the first exemplary embodiment.

Further, since it is highly possible that the information stored in the string region information storage unit 70 is close to a carried item to be extracted, and thus since the string region processing unit 15 performs the extraction referring to the close information, the accuracy of the extraction can be improved.

In this way, when sequentially a carried item close to that extracted in the preceding extraction follows the latter, the carried item region extraction device 7 according to the seventh exemplary embodiment can reduce the time period of the extraction, and improve the accuracy.

As a result, because the carried item region processing unit 20 extracts a carried item region on the basis of a string region of improved accuracy, the accuracy of the extraction is improved. And, since the processing time of the string region processing unit 15 is reduced, the carried item region extraction device 7 can reduce the time for extracting a carried item region from image information.

In addition, when the string region processing unit 15 can not extract using information stored in the string region information storage unit 70, it extracts a string region by changing reference information to information about the string region of another carried item, which is stored in the string region information storage unit 70.

Then, when the string region processing unit 15 can not extract using even the whole information stored in the string region information storage unit 70, it extracts a string region by operating in the same way as the string region processing unit 10 of the first exemplary embodiment does.

As has been described above, the carried item region extraction device 7 according to the seventh exemplary embodiment can achieve the effect of further reducing the extraction time and further improving the extraction accuracy, in addition to the effect of the carried item region extraction device 1 according to the first exemplary embodiment.

It is because, since the carried item region extraction device 7 stores information generated in its extraction process and use it for its subsequent extraction processing, if carried items having shapes close to each other follow one after another, the carried item region extraction device 7 can reduce the extraction time and also improve the extraction accuracy.

(Eighth Exemplary Embodiment)

The carried item region extraction device 7 according to the seventh exemplary embodiment stores information which it extracted or generated, and then uses the information. However, if a different type of carried item is entered at one point in time, the stored information changes, and thus, extraction operation of the carried item region extraction device 7 becomes unstable.

Considering it, a carried item region extraction device 8 according to an eighth exemplary embodiment is configured to refer to the stored information in the time series.

In addition, for the convenience of description, the time series reference in the eighth exemplary embodiment is described as a function equipped in a string region processing unit 16, but the present exemplary embodiment is not limited to this. Any one, or two or more, of a carried item region processing unit 20, a human region processing unit 30, a carried item identification unit 40, a human identification unit 50 and a string identification unit 60 may include operation on the basis of time series information.

Figure 19:
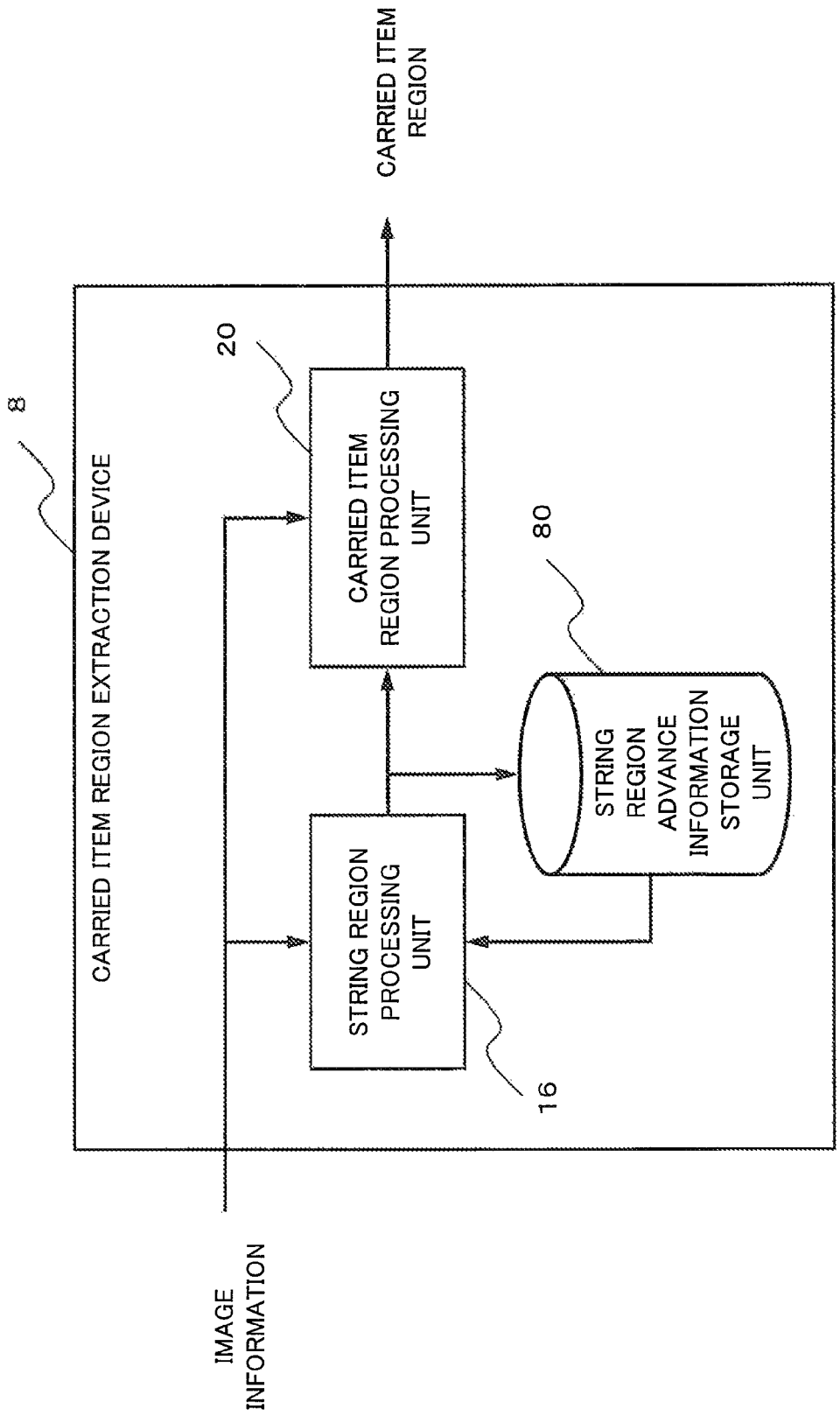
[FIG. 19] a block diagram showing an example of a carried item region extraction device according to an eighth exemplary embodiment.
Figure 20:
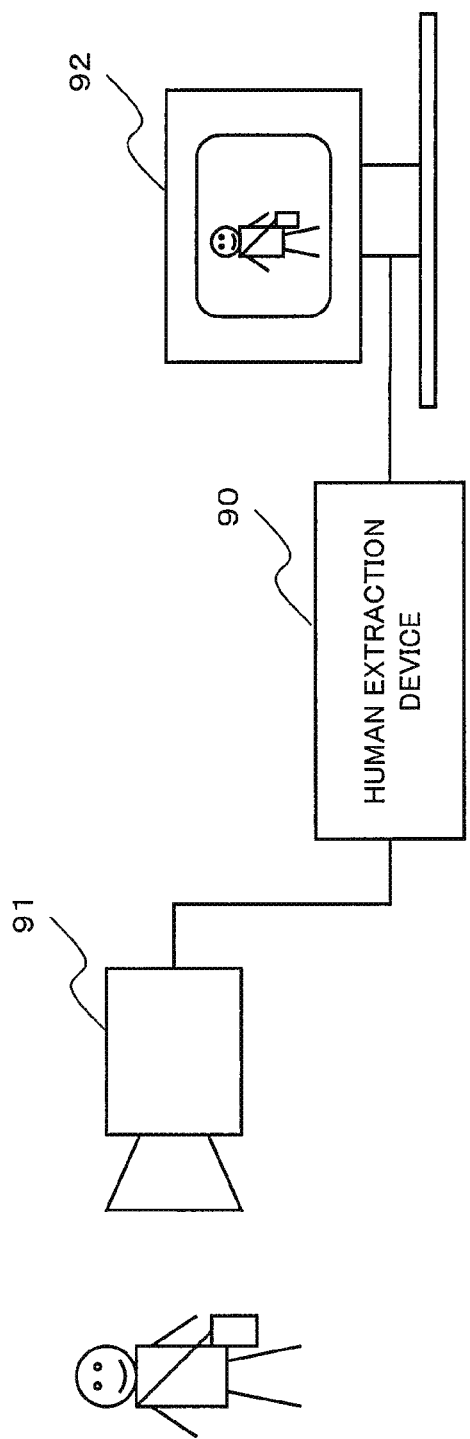
[FIG. 20] a diagram showing an example of a general human extraction system.

FIG. 19 is a block diagram showing an example of the carried item region extraction device 8 according to the eighth exemplary embodiment. In addition, in FIG. 19, the identical numbers are given to the same configuration as that in FIG. 1, and their detailed description will be omitted.

The carried item region extraction device 8 according to the eighth exemplary embodiment includes a string region processing unit 16 and a carried item region processing unit 20, and further includes a string region advance information storage unit 80.

The carried item region processing unit 20 is configured and operates in the same manner as the carried item region processing unit 20 according to the first exemplary embodiment.

The string region processing unit 16 sends information generated in its extracting a string region to the string region advance information storage unit 80, and stores the information therein. Then, when the string region processing unit 16 extracts a string region, it uses the information stored in the string region advance information storage unit 80, in addition to image information.

In addition, the information stored in the string region advance information storage unit 80 is information which the string region processing unit 16 uses for extracting a string region. Accordingly, the string region processing unit 16 does not need to store a string region to be sent to the carried item region processing unit 20, but may store information at an intermediate stage of its extraction process, for example, an edge component or an edge pair component in the carried item region processing unit 20. And, the string region processing unit 16 may store, in the carried item region processing unit 20, a string region with other information included therein, or information on a part of the string region.

The string region advance information storage unit 80 receives information from the string region processing unit 16 and stores it. However, the string region advance information storage unit 80 stores the information with information about the time of the storing (time information) added. In addition, instead of the advance information storage unit 80 adding the time information, the string region processing unit 16 may add the time information in its information and store the information in the string region advance information storage unit 80.

The carried item region extraction device 8 thus configured will be described.

In addition, when the string region processing unit 16 extracts a string region, its operations other than that of using information stored in the string region advance information storage unit 80 are the same as that in the first exemplary embodiment, and hence description of the same operations will be omitted.

When the string region processing unit 16 extracts a string region, it refers to a string region stored in the string region advance information storage unit 80.

As an example of this operation, the case of extracting an edge line pair component shown as the Step 1003 in FIG. 3 will be described.

When the string region processing unit 16 extracts an edge line pair component, it refers to the width of an edge line pair component stored in the string region advance information storage unit 80 and, on the basis of the width, determines whether or not an edge line pair component can be extracted.

If the extraction can be performed, the string region processing unit 16 extracts a string region on the basis of the extracted edge line pair component. In this way, since the string region processing unit 16 extracts a string region using information stored in the string region advance information storage unit 80, it can reduce the extraction time compared to extraction from an entire image.

Further, because it is highly possible that information stored in the string region advance information storage unit 80 is close to a carried item to be extracted, the string region processing unit 16 can also improve the extraction accuracy.

As a result, since the carried item region processing unit 20 extracts a carried item region on the basis of a string region of improved accuracy, it can improve the accuracy of extracting a carried item region. And, since the processing time of the string region processing unit 16 is reduced, the carried item region extraction device 8 can reduce the time for extracting a carried item region from image information.

Here, at a time of using information stored in the string region advance information storage unit 80, the string region processing unit 16 uses it after performing time series processing on the stored information.

For example, the string region processing unit 16 recognizes the times for edge line pair components stored in the string region advance information storage unit 80, and determines an average value of the widths of ten latest edge line pair components to be a width to be referred to in extracting an edge line pair component. Here, since the reference width is the average of ten pieces of data, the influence of an unexpectedly entering carried item becomes one-tenth. After that, when information on an ordinary carried item is stored, the influence of the unexpected carried item is still one-tenth. Moreover, when the number of information on new carried items exceeds ten, the string region processing unit 16 becomes not subjected to the influence of the unexpected carried item.

On the basis of such operation, because of using a time series average, the carried item region extraction device 8 according to the eighth exemplary embodiment can reduce the influence of a different type of carried item, even if it entered. In this way, the carried item region extraction device 8 according to the eighth exemplary embodiment has the tolerance to even variation of carried items.

In addition, time series processing used by the carried item region extraction device 8 is not limited to such simple averaging. For example, the carried item region extraction device 8 may use a weighted average calculated by setting the weights in the time series, or a statistical method such as the Karmann filter.

In addition, when the extraction cannot be performed using time series information, the string region processing unit 16 extracts a string region on the basis of the same operation as that of the string region processing unit 10 of the first exemplary embodiment.

In this way, the carried item region extraction device 8 according to the eighth exemplary embodiment can achieve the effect of further extracting a carried item region with higher accuracy, in addition to the effect of the carried item region extraction device 1 according to the first exemplary embodiment.

It is because, since the carried item region extraction device 8 uses previously extracted information in extracting a carried item region in the time series, it can improve the accuracy of the extraction process on the basis of previously generated or extracted information.

Further, the carried item region extraction device 8 according to the eighth exemplary embodiment can achieve the effect of realizing more stable operation, in addition to the effect of the carried item region extraction device 7 according to the seventh exemplary embodiment.

It is because, since the carried item region extraction device 8 uses stored information after performing time series processing on the information, it has the tolerance to temporary variation of carried items.

In each of the exemplary embodiments of the present invention described above, each of the processes may be executed under the control of a program executed by the use of a CPU. In that case, the carried item region extraction devices may include at least a CPU, a recording medium storing a program, a RAM for securing a working area for executing a program, and a disk storage unit as a storage place for data and information.

The whole or part of the exemplary embodiments disclosed above can be described as, but not limited to, the following supplementary notes.

(Supplementary Note 1)

A carried item region extraction device comprising:

a string region processing unit which extracts a string region including a string of a carried item from image information; and a carried item region processing unit which extracts a carried item region including a carried item from said image information on the basis of said string region.

(Supplementary Note 2)

The carried item region extraction device according to supplementary note 1, wherein said string region processing unit comprises:

an edge component extraction unit which extracts an edge component of said image information;

a string region line pair component extraction unit which extracts an edge line pair component on the basis of said edge component; and a string region extraction unit which extracts a string region on the basis of said edge line pair component.

(Supplementary Note 3)

The carried item region extraction device according to supplementary note 2, wherein said string region line pair component extraction unit comprises:

an edge line component generation unit which generates an edge line component on the basis of said edge component; and an edge line pair component extraction unit which extracts an edge line pair component on the basis of said edge line component.

(Supplementary Note 4)

The carried item region extraction device according to supplementary note 2, wherein said string region line pair component extraction unit comprises:

an edge pair component extraction unit which extracts an edge pair component on the basis of said edge component; and an edge line pair component unit which generates an edge line pair component on the basis of said edge pair component.

(Supplementary Note 5)

The carried item region extraction device according to any one of supplementary notes 1 to 4, wherein said carried item region processing unit comprises:

a carried item candidate region extraction unit which extracts a carried item candidate region including a carried item region on the basis of said string region; and a carried item region extraction unit which extracts a carried item region on the basis of said carried item candidate region.

(Supplementary Note 6)

The carried item region extraction device according to any one of supplementary notes 1 to 5, further comprising a human region extraction unit which extracts a human region including a part or the whole of a human included in said image information; and said string region processing unit extracts said string region on the basis of said human region.

(Supplementary Note 7)

The carried item region extraction device according to any one of supplementary notes 1 to 6, further comprising:

a carried item identification unit which identifies a carried item on the basis of said carried item region.

(Supplementary Note 8)

The carried item region extraction device according to supplementary note 7, further comprising a human identification unit which receives information on a carried item from said carried item identification unit, and identifies a person holding said carried item.

(Supplementary Note 9)

The carried item region extraction device according to any one of supplementary notes 1 to 8, wherein said string region processing unit extracts said string region on the basis of an attribute of a person holding said carried item or an attribute of said carried item.

(Supplementary Note 10)

The carried item region extraction device according to any one of supplementary notes 1 to 9, further comprising:

a string identification unit which identifies a string on the basis of said string region.

(Supplementary Note 11)

The carried item region extraction device according to any one of supplementary notes 1 to 10, further comprising:

an information storage unit which stores information generated in extraction of a string region by said string region processing unit; and said string region processing unit utilizes, in extraction of a string region, said information stored in said information storage unit.

(Supplementary Note 12)

The carried item region extraction device according to any one of supplementary notes 1 to 10, further comprising:

an advance information storage unit which stores information generated in extraction of a string region by said string region processing unit, along with temporal information; and said string region processing unit utilizes, in extraction of a string region, said information stored in said advance information storage unit, after performing time series processing on the information.

(Supplementary Note 13)

A carried item region extracting method comprising:

extracting a string region including a string of a carried item from image information; and extracting a carried item region including a carried item from said image information on the basis of said string region.

(Supplementary Note 14)

The carried item region extracting method according to supplementary note 13, wherein said extracting a string region comprises:

extracting an edge component of said image information;

extracting an edge line pair component on the basis of said edge component; and extracting a string region on the basis of said edge line pair component.

(Supplementary Note 15)

The carried item region extracting method according to supplementary note 14, wherein said extracting a string region line pair component comprises:

extracting an edge line component on the basis of said edge component; and extracting an edge line pair component on the basis of said edge line component.

(Supplementary Note 16)

The carried item region extracting method according to supplementary note 14, wherein said extracting a string region line pair component comprises:

extracting an edge pair component on the basis of said edge component; and extracting an edge line pair component on the basis of said edge pair component.

(Supplementary Note 17)

The carried item region extracting method according to any one of supplementary notes 13 to 16, wherein said extracting a carried item region comprises:

extracting a carried item candidate region including a carried item region on the basis of said string region; and extracting a carried item region on the basis of said carried item candidate region.

(Supplementary Note 18)

The carried item region extracting method according to any one of supplementary notes 13 to 17, further comprising:

extracting a human region including a part or the whole of a human included in said image information; and extracting said string region on the basis of said human region.

(Supplementary Note 19)

The carried item region extracting method according to any one of supplementary notes 13 to 18, further comprising:

identifying a carried item on the basis of said carried item region.

(Supplementary Note 20)

The carried item region extracting method according to supplementary note 19, further comprising:

identifying a person holding said carried item on the basis of said identification of a carried item.

(Supplementary Note 21)

The carried item region extracting method according to any one of supplementary notes 13 to 20, wherein extracting said string region on the basis of an attribute of a person holding said carried item or of an attribute of said carried item.

(Supplementary Note 22)

The carried item region extracting method according to any one of supplementary notes 13 to 21, further comprising:

identifying a string on the basis of said string region.

(Supplementary Note 23)

The carried item region extracting method according to any one of supplementary notes 13 to 22, further comprising:

storing information generated in said extracting a string region; and utilizing said stored information in said extracting a said string region.

(Supplementary Note 24)

The carried item region extracting method according to any one of supplementary notes 13 to 22, further comprising:

storing information generated in said extracting a string region along with temporal information; and utilizing said stored information in said extracting a string region after performing time series processing on the information.

(Supplementary Note 25)

A carried item region extraction program causing a computer to execute:

a process of extracting a string region including a string of a carried item from image information; and a process of extracting a carried item region including a carried item from said image information on the basis of said string region.

(Supplementary Note 26)

The carried item region extraction program according to supplementary note 25, wherein said process of extracting a string region comprises:

a process of extracting an edge component of said image information;

a process of extracting an edge line pair component on the basis of said edge component; and a process of extracting a string region on the basis of said edge line pair component.

(Supplementary Note 27)

The carried item region extraction program according to supplementary note 26, wherein said process of extracting a string region line pair component comprises:

a process of extracting an edge line component on the basis of said edge component; and a process of extracting an edge line pair component on the basis of said edge line component.

(Supplementary Note 28)

The carried item region extraction program according to supplementary note 26, wherein said process of extracting a string region line pair component comprises:

a process of extracting an edge pair component on the basis of said edge component; and a process of extracting an edge line pair component on the basis of said edge pair component.

(Supplementary Note 29)

The carried item region extraction program according to any one of supplementary notes 25 to 28, wherein said process of extracting a carried item region comprises:
a process of extracting a carried item candidate region including a carried item region, on the basis of said string region; and
a process of extracting a carried item region on the basis of said carried item candidate region.

(Supplementary Note 30)
The carried item region extraction program according to any one of supplementary notes 25 to 29, further comprising:
a process of extracting a human region including a part or the whole of a human included in said image information; and
said process of extracting a string region is based on said human region.

(Supplementary Note 31)
The carried item region extraction program according to any one of supplementary notes 25 to 30, further comprising:
a process of identifying a carried item on the basis of said carried item region.

(Supplementary Note 32)
The carried item region extraction program according to supplementary note 31, further comprising:
a process of identifying a person holding said carried item, on the basis of said identification of a carried item.

(Supplementary Note 33)
The carried item region extraction program according to any one of supplementary notes 25 to 32, wherein
a process of extracting a string region on the basis of an attribute of a person holding said carried item or an attribute of said carried item.

(Supplementary Note 34)
The carried item region extraction program according to any one of supplementary notes 25 to 33, further comprising:
a process of identifying a string on the basis of said string region.

(Supplementary Note 35)
The carried item region extraction program according to any one of supplementary notes 25 to 34, further comprising:
a process of storing information generated in said process of extracting a string region; and
a process of utilizing said stored information in said process of extracting a string region.

(Supplementary Note 36)
The carried item region extraction program according to any one of supplementary notes 25 to 34, further comprising:
a process of storing information generated in said process of extracting a string region, along with temporal information; and
a process of utilizing said stored information in said process of extracting a string region, after performing time series processing on said stored information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-209434, filed on Sep. 17, 2010, the disclosure of which is incorporated herein in its entirety by reference.

[Description of Symbol]
1, 2, 3, 4, 5, 6, 7, 8 carried item region extraction device
10, 11, 12, 13, 14, 15, 16 string region processing unit
20, 21 carried item region processing unit
30, 31, 32 human region processing unit
40 carried item identification unit
50 human identification unit
60 string identification unit
70 string region information storage unit
80 string region advance information storage unit
90 human extraction device
91 capturing device
92 display device
101 edge component extraction unit
102 edge line component generation unit
103 edge line pair component extraction unit
104 string region extraction unit
105 edge pair component extraction unit
106 edge line pair component generation unit
107 string region line pair component extraction unit
201 carried item candidate region extraction unit
202 carried item region extraction unit
301, 305 head region extraction unit
302, 304 chest region extraction unit
303 human region extraction unit

The invention claimed is:
1. A carried item region extraction device comprising:
a CPU; and
a non-transitory computer readable recording medium storing a program;
wherein:
the CPU is configured to implement:
a string region processing configured to extract a string region including a string of a carried item from image information; and
a carried item region processing configured to extract a carried item region including a carried item from said image information on the basis of said string region;
said string region processing comprises:
an edge component extraction configured to extract an edge component of said image information;
a string region line pair component extraction configured to extract an edge line pair component on the basis of said edge component; and
a string region extraction configured to extract the string region on the basis of said edge line pair component; and
said string region line pair component extraction comprises:
an edge line component generation configured to generate an edge line component on the basis of said edge component by using a predetermined width for said edge line component; and
an edge line pair component extraction configured to extract an edge line pair component on the basis of said edge line component.

2. The carried item region extraction device according to claim 1, wherein
said carried item region processing comprises:
a carried item candidate region extraction configured to generate a carried item candidate region including a carried item region on the basis of said string region; and
a carried item region extraction configured to extract a carried item region on the basis of said carried item candidate region.

3. The carried item region extraction device according to claim 1, further comprising:
a human region extraction which is configured to extract a human region including a part or the whole of a human included in said image information, wherein
said string region processing is configured to extract said string region on the basis of said human region.

4. The carried item region extraction device according to claim 1, further comprising:
a carried item identification configured to identity a carried item on the basis of said carried item region.

5. The carried item region extraction device according to claim 4, further comprising:
a human identification configured to receive information on a carried item from said carried item identification and to identify a person holding said carried item.

6. The carried item region extraction device of claim 1, wherein the carried item region processing or the carried item candidate region extraction is configured to consider a gradient of a string region in the image information.

7. The carried item region extraction device of claim 1, wherein the carried item region processing or the carried item candidate region extraction is configured to consider an attribute information of a string region.

8. The carried item region extraction device of claim 1, wherein a string identification is configured to identify string information by identifying a string type, and the carried item region processing which uses the string information.

9. A carried item region extraction device comprising:
a CPU; and
a non-transitory recording medium storing a program;
wherein:
the CPU is configured to implement:
a string region processing configured to extract a string region including a string of a carried item from image information; and
a carried item region processing configured to extract a carried item region including a carried item from said image information on the basis of said string region;
said string region processing comprises:
an edge component extraction configured to extract an edge component of said image information;
a string region line pair component extraction configured to extract an edge line pair component on the basis of said edge component; and
a string region extraction configured to extract a string region on the basis of said edge line pair component; and
said string region line pair component extraction comprises:
an edge pair component extraction configured to extract an edge pair component on the basis of said edge component by using a predetermined separation distance associated with said edge pair component; and
an edge line pair component generation configured to generate an edge line pair component on the basis of said edge pair component.

10. The carried item region extraction device according to claim 9, wherein
said carried item region processing comprises:
a carried item candidate region extraction configured to generate a carried item candidate region including a carried item region on the basis of said string region; and
a carried item region extraction configured to extract a carried item region on the basis of said carried item candidate region.

11. The carried item region extraction device according to claim 2, further comprising:
a human region extraction configured to extract a human region including a part or the whole of a human included in said image information, wherein said string region processing configured to extract said string region on the basis of said human region.

12. The carried item region extraction device according to claim 9, further comprising:
a carried item identification configured to identify a carried item on the basis of said carried item region.

13. The carried item region extraction device according to claim 12, further comprising:
a human identification configured to receive information on a carried item from said carried item identification and to identify a person holding said carried item.

14. The carried item region extraction device of claim 9, wherein the carried item region processing or the carried item candidate region extraction is configured to consider a gradient of a string region in the image information.

15. The carried item region extraction device of claim 9, wherein the carried item region processing or the carried item candidate region extraction is configured to consider an attribute information of a string region.

16. The carried item region extraction device of claim 9, wherein a string identification is configured to identify string information by identifying a string type, and the carried item region processing which uses the string information.

17. A carried item region extraction method for a carried item region extraction device comprising:
extracting a string region including a string of a carried item from image information;
extracting a carried item region including a carried item from said image information on the basis of said string region;
extracting an edge component of said image information;
extracting an edge line pair component on the basis of said edge component;
extracting the string region on the basis of said edge line pair component;
generating an edge line component on the basis of said edge component by using a predetermined width for said edge line component; and
extracting an edge line pair component on the basis of said edge line component.

18. A non-transitory computer readable medium storing a program, said program causing a carried item region extraction device to perform a method, said method comprising:
extracting a string region including a string of a carried item from image information;
extracting a carried item region including a carried item from said image information on the basis of said string region;
extracting an edge component of said image information;
extracting an edge line pair component on the basis of said edge component;
extracting the string region on the basis of said edge line pair component;
generating an edge line component on the basis of said edge component by using a predetermined width for said edge line component; and
extracting an edge line pair component on the basis of said edge line component.

19. A carried item region extraction means comprising:
a string region processing means configured to extract a string region including a string of a carried item from image information; and
a carried item region processing means configured to extract a carried item region including a carried item from said image information on the basis of said string region;

wherein:
said string region processing means comprises:
- an edge component extraction means which extracts an edge component of said image information;
- a string region line pair component extraction means which extracts an edge line pair component on the basis of said edge component; and
- a string region extraction means which extracts a string region on the basis of said edge line pair component; and said string region line pair component extraction mean comprises:
- an edge line component generation means which generates an edge line component on the basis of said edge component by using a predetermined width for said edge line component; and
- an edge line pair component extraction means which extracts an edge line pair component on the basis of said edge line component.

* * * * *